US012235601B2

(12) United States Patent
Someya et al.

(10) Patent No.: US 12,235,601 B2
(45) Date of Patent: Feb. 25, 2025

(54) NIP FORMING DEVICE INCLUDING A SEPARATOR FOR SEPARATING A CONVEYED OBJECT HAVING PASSED THROUGH A NIP FROM AN ENDLESS BELT, FIXING DEVICE INCLUDING THE NIP FORMING DEVICE, AND IMAGE FORMING APPARATUS INCLUDING THE NIP FORMING DEVICE

(71) Applicants: Yukimichi Someya, Saitama (JP); Yuusuke Furuichi, Kanagawa (JP); Tomoya Adachi, Kanagawa (JP); Hiroyuki Shimada, Tokyo (JP)

(72) Inventors: Yukimichi Someya, Saitama (JP); Yuusuke Furuichi, Kanagawa (JP); Tomoya Adachi, Kanagawa (JP); Hiroyuki Shimada, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 78 days.

(21) Appl. No.: 18/184,190

(22) Filed: Mar. 15, 2023

(65) Prior Publication Data

US 2023/0297016 A1 Sep. 21, 2023

(30) Foreign Application Priority Data

Mar. 17, 2022 (JP) ................................ 2022-042543

(51) Int. Cl.
*G03G 15/20* (2006.01)

(52) U.S. Cl.
CPC ..... *G03G 15/2057* (2013.01); *G03G 15/2064* (2013.01); *G03G 2215/2038* (2013.01)

(58) Field of Classification Search
USPC .......................................................... 399/328
See application file for complete search history.

(56) References Cited

U.S. PATENT DOCUMENTS

2002/0025204 A1* 2/2002 Ando ................. G03G 15/2028 358/1.12
2013/0236225 A1* 9/2013 Ogawa ............... G03G 15/2064 399/329

(Continued)

FOREIGN PATENT DOCUMENTS

JP 2006-153948 6/2006
JP 2006-235006 9/2006

(Continued)

OTHER PUBLICATIONS

U.S. Appl. No. 17/864,434, filed Jul. 14, 2022, Yukimichi Someya, et al.

(Continued)

*Primary Examiner* — Quana Grainger
(74) *Attorney, Agent, or Firm* — Harness, Dickey & Pierce, P.L.C.

(57) ABSTRACT

A nip forming device includes an endless belt that is flexible and rotates. A nip formation pad is disposed opposite an inner circumferential face of the endless belt. A pressure rotator rotates and presses against the nip formation pad via the endless belt to form a nip between the endless belt and the pressure rotator, through which a conveyed object is conveyed. A housing supports the pressure rotator. A separator is disposed downstream from the nip in a conveyance direction in which the conveyed object is conveyed. The separator separates the conveyed object from the endless belt. The separator moves toward and away from the endless belt. A restrictor restricts motion of the separator that moves toward the endless belt. The restrictor is mounted on the housing.

19 Claims, 15 Drawing Sheets

(56) References Cited

U.S. PATENT DOCUMENTS

| | | | |
|---|---|---|---|
| 2021/0278790 | A1 | 9/2021 | Furuichi et al. |
| 2021/0364958 | A1 | 11/2021 | Someya et al. |
| 2022/0299919 | A1 | 9/2022 | Inoue et al. |
| 2022/0299920 | A1 | 9/2022 | Shimada et al. |
| 2022/0308511 | A1 | 9/2022 | Someya et al. |
| 2022/0382192 | A1 | 12/2022 | Inoue et al. |
| 2023/0004108 | A1 | 1/2023 | Furuichi et al. |
| 2023/0063779 | A1 | 3/2023 | Shimada et al. |

FOREIGN PATENT DOCUMENTS

| | | |
|---|---|---|
| JP | 2009-288587 | 12/2009 |
| JP | 2011-028081 | 2/2011 |
| JP | 2015-011167 | 1/2015 |
| JP | 2015-031891 | 2/2015 |

OTHER PUBLICATIONS

U.S. Appl. No. 18/060,566, filed Nov. 30, 2022, Yuusuke Furuichi, et al.

* cited by examiner

NIP FORMING DEVICE INCLUDING A SEPARATOR FOR SEPARATING A CONVEYED OBJECT HAVING PASSED THROUGH A NIP FROM AN ENDLESS BELT, FIXING DEVICE INCLUDING THE NIP FORMING DEVICE, AND IMAGE FORMING APPARATUS INCLUDING THE NIP FORMING DEVICE

CROSS-REFERENCE TO RELATED APPLICATION

This patent application is based on and claims priority pursuant to 35 U.S.C. § 119(a) to Japanese Patent Application No. 2022-042543, filed on Mar. 17, 2022, in the Japan Patent Office, the entire disclosure of which is hereby incorporated by reference herein.

BACKGROUND

Technical Field

Embodiments of this disclosure relate to a nip forming device, a fixing device, and an image forming apparatus, and more specifically, to a nip forming device incorporating a separator for separating a conveyed object having passed through a nip from an endless belt, a fixing device incorporating the nip forming device, and an image forming apparatus incorporating the nip forming device.

Related Art

Related-art image forming apparatuses, such as copiers, facsimile machines, printers, and multifunction peripherals (MFP) having two or more of copying, printing, scanning, facsimile, plotter, and other functions, typically form an image on a recording medium according to image data.

Such image forming apparatuses include a fixing device that fixes an image on a recording medium such as a sheet. The fixing device employs a belt fixing method using an endless belt.

SUMMARY

This specification describes below an improved nip forming device. In one embodiment, the nip forming device includes an endless belt that is flexible and rotates. A nip formation pad is disposed opposite an inner circumferential face of the endless belt. A pressure rotator rotates and presses against the nip formation pad via the endless belt to form a nip between the endless belt and the pressure rotator, through which a conveyed object is conveyed. A housing supports the pressure rotator. A separator is disposed downstream from the nip in a conveyance direction in which the conveyed object is conveyed. The separator separates the conveyed object from the endless belt. The separator moves toward and away from the endless belt. A restrictor restricts motion of the separator that moves toward the endless belt. The restrictor is mounted on the housing.

This specification further describes an improved fixing device. In one embodiment, the fixing device fixes an image on a recording medium and includes an endless belt that is flexible and rotates. A nip formation pad is disposed opposite an inner circumferential face of the endless belt. A pressure rotator rotates and presses against the nip formation pad via the endless belt to form a nip between the endless belt and the pressure rotator, through which the recording medium bearing the image is conveyed. A housing supports the pressure rotator. A separator is disposed downstream from the nip in a conveyance direction in which the recording medium is conveyed. The separator separates the recording medium from the endless belt. The separator moves toward and away from the endless belt. A restrictor restricts motion of the separator that moves toward the endless belt. The restrictor is mounted on the housing.

This specification further describes an improved image forming apparatus. In one embodiment, the image forming apparatus includes an image forming device that forms an image and a nip forming device that conveys a recording medium bearing the image. The nip forming device includes an endless belt that is flexible and rotates. A nip formation pad is disposed opposite an inner circumferential face of the endless belt. A pressure rotator rotates and presses against the nip formation pad via the endless belt to form a nip between the endless belt and the pressure rotator, through which the recording medium is conveyed. A housing supports the pressure rotator. A separator is disposed downstream from the nip in a conveyance direction in which the recording medium is conveyed. The separator separates the recording medium from the endless belt. The separator moves toward and away from the endless belt. A restrictor restricts motion of the separator that moves toward the endless belt. The restrictor is mounted on the housing.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
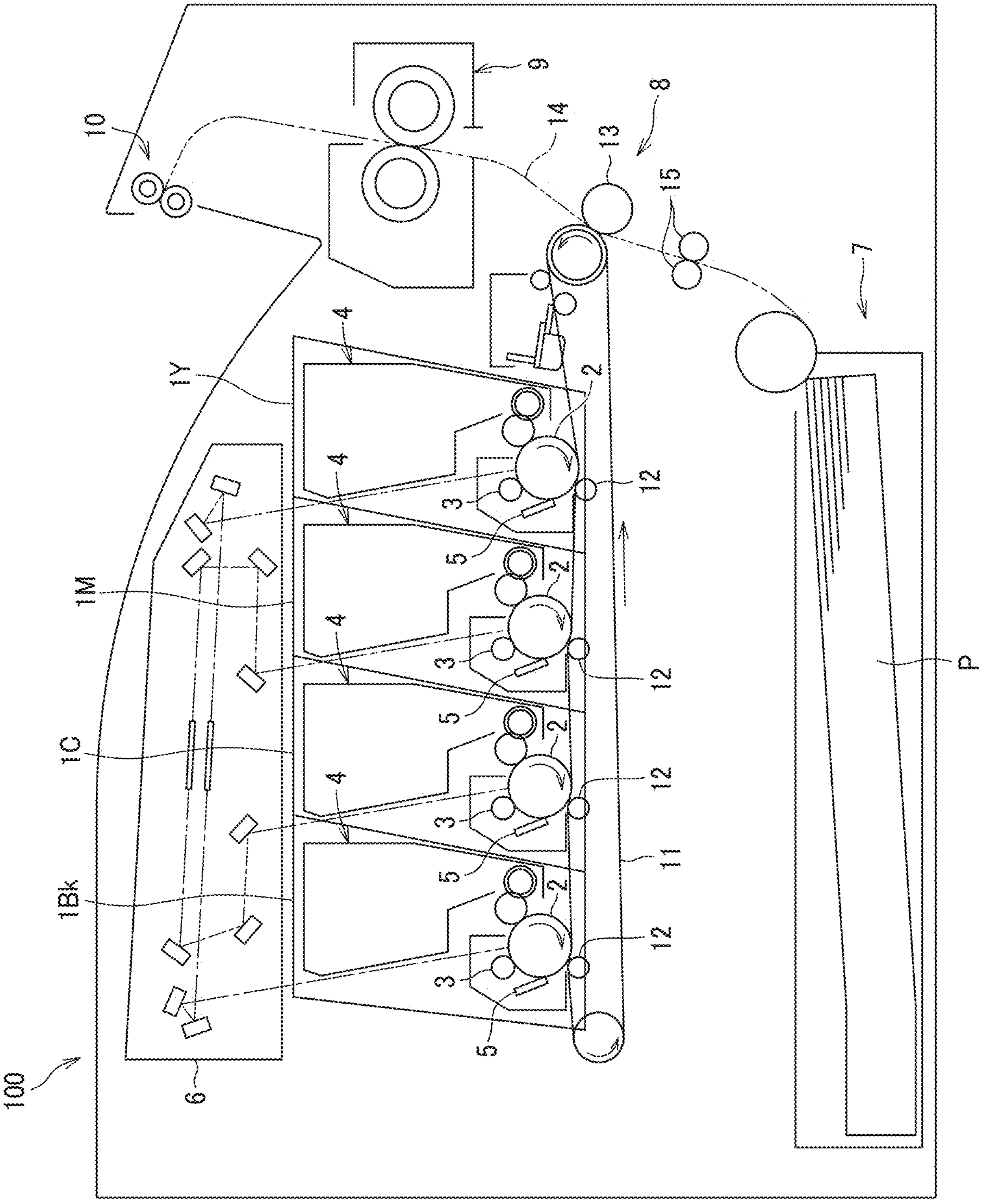
FIG. 1 is a schematic cross-sectional view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Referring to the attached drawings, the following describes embodiments of the present disclosure. In the drawings for explaining the embodiments of the present disclosure, identical reference numerals are assigned to elements such as members and parts that have an identical function or an identical shape as long as differentiation is possible and a description of those elements is omitted once the description is provided.

A description is provided of a construction of an image forming apparatus 100.

FIG. 1 is a schematic cross-sectional view of the image forming apparatus 100 according to an embodiment of the present disclosure. As illustrated in FIG. 1, the image forming apparatus 100 includes four image forming units 1Y, 1M, 1C, and 1Bk, serving as image forming devices, that are installed in an apparatus body of the image forming apparatus 100 such that the image forming units 1Y, 1M, 1C, and 1Bk are attached to and removed from the apparatus body of the image forming apparatus 100.

The image forming units 1Y, 1M, 1C, and 1Bk have a similar construction. However, the image forming units 1Y, 1M, 1C, and 1Bk contain developers in different colors, that is, yellow, magenta, cyan, and black, respectively, which correspond to color separation components for a color image. For example, each of the image forming units 1Y, 1M, 1C, and 1Bk includes a photoconductor 2, a charger 3, a developing device 4, and a cleaner 5. The photoconductor 2 is drum-shaped and serves as an image bearer. The charger 3 charges a surface of the photoconductor 2. The developing device 4 supplies toner as the developer to the surface of the photoconductor 2 to form a toner image. The cleaner 5 cleans the surface of the photoconductor 2.

The image forming apparatus 100 further includes an exposure device 6, a sheet feeder 7, a transfer device 8, a fixing device 9, and an output device 10. The exposure device 6 exposes the surface of each of the photoconductors 2 and forms an electrostatic latent image thereon. The sheet feeder 7 supplies a sheet P serving as a conveyed object or a recording medium to the transfer device 8. The transfer device 8 transfers the toner image formed on each of the photoconductors 2 onto the sheet P. The fixing device 9 serves as a nip forming unit or a nip forming device that fixes the toner image transferred onto the sheet P thereon. The output device 10 ejects the sheet P onto an outside of the image forming apparatus 100. The recording media include, in addition to plain paper as a sheet P, thick paper, a postcard, an envelope, thin paper, coated paper, art paper, tracing paper, an overhead projector (OHP) transparency, plastic film, prepreg, and copper foil.

The transfer device 8 includes an intermediate transfer belt 11, four primary transfer rollers 12, and a secondary transfer roller 13. The intermediate transfer belt 11 is an endless belt serving as an intermediate transferor stretched taut across a plurality of rollers. The four primary transfer rollers 12 serve as primary transferors that transfer yellow, magenta, cyan, and black toner images formed on the photoconductors 2 onto the intermediate transfer belt 11, respectively, thus forming a full color toner image on the intermediate transfer belt 11. The secondary transfer roller 13 serves as a secondary transferor that transfers the full color toner image formed on the intermediate transfer belt 11 onto the sheet P. The plurality of primary transfer rollers 12 is pressed against the photoconductors 2, respectively, via the intermediate transfer belt 11.

Accordingly, the intermediate transfer belt 11 contacts each of the photoconductors 2, forming a primary transfer nip therebetween. On the other hand, the secondary transfer roller 13 is pressed against one of the plurality of rollers across which the intermediate transfer belt 11 is stretched taut via the intermediate transfer belt 11. Thus, a secondary transfer nip is formed between the secondary transfer roller 13 and the intermediate transfer belt 11.

The image forming apparatus 100 accommodates a sheet conveyance path 14 through which the sheet P fed from the sheet feeder 7 is conveyed. The sheet conveyance path 14 is provided with a timing roller pair 15 at a position between the sheet feeder 7 and the secondary transfer nip defined by the secondary transfer roller 13.

Referring to FIG. 1, a description is provided of printing processes performed by the image forming apparatus 100 having the construction described above.

When the image forming apparatus 100 receives an instruction to start printing (e.g., a print job), a driver disposed inside the apparatus body of the image forming apparatus 100 drives and rotates the photoconductor 2 clockwise in FIG. 1 in each of the image forming units 1Y, 1M, 1C, and 1Bk. The charger 3 charges the surface of the photoconductor 2 uniformly at a high electric potential. Subsequently, the exposure device 6 exposes the surface of each of the photoconductors 2 according to image data (e.g., print data) instructed by a terminal, thus decreasing the electric potential of an exposed portion on the photoconductor 2 and forming an electrostatic latent image on the photoconductor 2. Alternatively, if the image forming apparatus 100 is a copier, the exposure device 6 exposes the surface of each of the photoconductors 2 according to image data created by a scanner that reads an image on an original. The developing device 4 of each of the image forming units 1Y, 1M, 1C, and 1Bk supplies toner to the electrostatic latent image formed on the photoconductor 2, forming a toner image thereon.

When the toner images formed on the photoconductors 2 reach the primary transfer nips defined by the primary transfer rollers 12 in accordance with rotation of the photoconductors 2, the primary transfer rollers 12 transfer the toner images formed on the photoconductors 2 onto the intermediate transfer belt 11 driven and rotated counterclockwise in FIG. 1 successively such that the toner images are superimposed on the intermediate transfer belt 11, thus forming a full color toner image thereon. Thereafter, as the full color toner image formed on the intermediate transfer belt 11 is conveyed to the secondary transfer nip defined by the secondary transfer roller 13 in accordance with rotation of the intermediate transfer belt 11, the secondary transfer roller 13 transfers the full color toner image onto a sheet P conveyed to the secondary transfer nip.

The sheet P is supplied from the sheet feeder 7. The timing roller pair 15 temporarily halts the sheet P supplied from the sheet feeder 7. Thereafter, the timing roller pair 15 conveys the sheet P to the secondary transfer nip at a time when the full color toner image formed on the intermediate transfer belt 11 reaches the secondary transfer nip. The secondary transfer roller 13 transfers the full color toner image onto the sheet P. Thus, the sheet P bears the full color toner image. After the toner image is transferred onto the intermediate transfer belt 11, the cleaner 5 removes residual toner remaining on the photoconductor 2 therefrom.

The sheet P transferred with the full color toner image is conveyed to the fixing device 9 that fixes the full color toner image on the sheet P. Thereafter, the output device 10 ejects the sheet P onto the outside of the image forming apparatus 100, thus finishing a series of printing processes.

A description is provided of a construction of the fixing device 9, serving as the nip forming unit or the nip forming device, according to an embodiment of the present disclosure.

Figure 2:
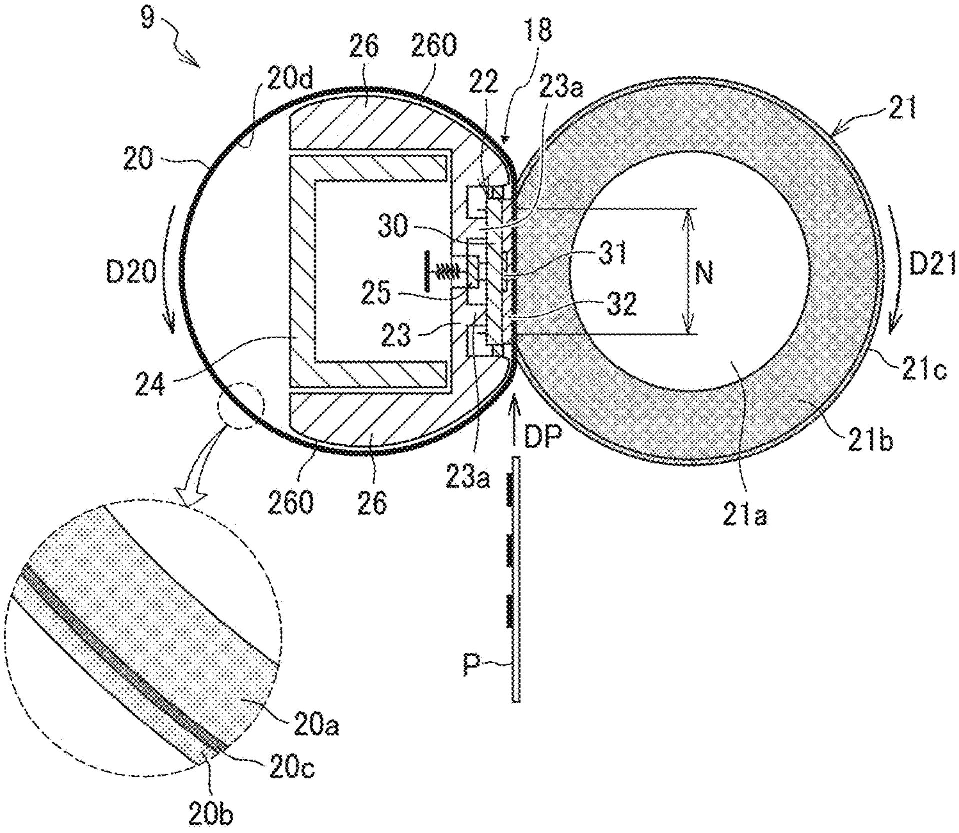
FIG. 2 is a schematic cross-sectional view of a fixing device according to an embodiment of the present disclosure that is incorporated in the image forming apparatus depicted in FIG. 1.

As illustrated in FIG. 2, the fixing device 9 according to the embodiment includes a fixing belt 20, a pressure roller 21, a heater 22, a heater holder 23, a stay 24, and thermistors 25. The fixing belt 20 is an endless belt. The fixing belt 20 rotates in a rotation direction D20. The pressure roller 21 serves as a pressure rotator that contacts an outer circumferential face of the fixing belt 20 to form a fixing nip N between the fixing belt 20 and the pressure roller 21. The pressure roller 21 rotates in a rotation direction D21. The heater 22 serving as a heater or a nip formation pad heats the fixing belt 20. The heater holder 23 serves as a holder that holds or supports the heater 22. The stay 24 serves as a support that supports the heater holder 23. The thermistors 25 serve as temperature detectors that detect temperatures of the heater 22, respectively. The fixing device 9 includes a belt unit 18 that includes the fixing belt 20, the heater 22, the heater holder 23, and the stay 24.

The fixing device 9 further includes a sheet separation assembly 300, 300A, 300B, or 300C described below with reference to FIGS. 7A, 7B, 7C, 7D, 7E, and 7F. FIG. 2 omits illustration of the sheet separation assembly 300, 300A, 300B, or 300C. The sheet separation assembly 300, 300A, 300B, or 300C is disposed downstream from the fixing nip N in a sheet conveyance direction DP depicted in FIG. 2 in which the sheet P is conveyed, as illustrated in FIGS. 7A, 7B, 7C, 7D, 7E, and 7F.

As illustrated in FIG. 2, the fixing belt 20 has an outer diameter of 25 mm and includes a tubular base layer 20*a* that is made of resin such as polyimide (PI) and has a thickness in a range of from 40 μm to 120 μm, for example. The fixing belt 20 further includes a release layer 20*b* serving as an outermost surface layer or a surface layer. The release layer 20*b* is made of fluororesin, such as perfluoroalkoxy alkane (PFA) and polytetrafluoroethylene (PTFE), and has a thickness in a range of from 5 μm to 50 μm to enhance durability of the fixing belt 20 and facilitate separation of the sheet P and a foreign substance from the fixing belt 20. The fixing belt 20 further includes an adhesion layer 20*c* that is interposed between the base layer 20*a* and the release layer 20*b* and adhered with the base layer 20*a* and the release layer 20*b*.

The fixing belt 20 may further include an elastic layer that is interposed between the base layer 20*a* and the release layer 20*b*. The elastic layer is made of rubber or the like and has a thickness in a range of from 50 μm to 500 μm. The base layer 20*a* of the fixing belt 20 may be made of heat-resistant resin such as polyetheretherketone (PEEK) or metal such as nickel (Ni) and stainless used steel (SUS), instead of polyimide. The fixing belt 20 includes an inner circumferential face 20*d* that may be coated with polyimide, PTFE, or the like to produce a sliding layer.

As illustrated in an enlarged view in FIG. 2, the fixing belt 20 is constructed of the base layer 20*a*, the adhesion layer 20*c*, and the release layer 20*b* and does not incorporate the elastic layer interposed between the base layer 20*a* and the release layer 20*b*. If the fixing belt 20 does not incorporate the elastic layer, an entirety of the fixing belt 20 may suffer from degradation in rigidity. Accordingly, when the fixing belt 20 halts, the fixing belt 20 is subject to deformation as described below.

However, the fixing device 9 according to the embodiment further includes a separation plate 310 described below with reference to FIG. 7A. The separation plate 310 pivots in accordance with motion of the outer circumferential face of the fixing belt 20 as described below. Hence, the separation plate 310 separates the sheet P from the fixing belt 20 stably. Since the fixing belt 20 does not incorporate the elastic layer, a single layer, that is, the adhesion layer 20*c*, is interposed between the base layer 20*a* and the release layer 20*b*. A configuration in which the single layer (e.g., the adhesion layer 20*c*) is interposed between the base layer 20*a* and the release layer 20*b* also denotes a configuration in which two or more layers (e.g., the adhesion layers 20*c*) are contiguously interposed between the base layer 20*a* and the release layer 20*b*.

The pressure roller 21 has an outer diameter of 25 mm, for example. The pressure roller 21 includes a core metal 21*a*, an elastic layer 21*b*, and a release layer 21*c*. The core metal 21*a* is solid and made of iron. The elastic layer 21*b* is disposed on a surface of the core metal 21*a*. The release layer 21*c* coats an outer surface of the elastic layer 21*b*. The elastic layer 21*b* is made of silicone rubber and has a thickness of 3.5 mm, for example. In order to facilitate separation of the sheet P, the toner, and the foreign substance from the pressure roller 21, the release layer 21*c* that is made of fluororesin and has a thickness of approximately 40 m, for example, is preferably disposed on the outer surface of the elastic layer 21*b*.

The fixing belt 20 has a belt diameter that is greater than a diameter of the pressure roller 21. Hence, the fixing belt 20 increases a length of the heater 22 in the sheet conveyance direction DP so that the fixing device 9 is employed in the image forming apparatus 100 that prints at a high speed. As the belt diameter of the fixing belt 20 increases, deformation of the entirety of the fixing belt 20 decreases with respect to a length of the fixing nip N in the sheet conveyance direction DP. Thus, the fixing belt 20 suppresses deformation thereof and causes the separation plate 310 to separate the sheet P from the fixing belt 20 stably.

However, if the length of the heater 22 in the sheet conveyance direction DP increases excessively, deformation of the fixing belt 20 may increase. Hence, the length of the heater 22 in the sheet conveyance direction DP is adjusted to a proper size.

The fixing device 9 further includes a biasing member that biases and moves the pressure roller 21 toward the fixing belt 20, pressing the pressure roller 21 against the heater 22 via the fixing belt 20. Thus, the fixing nip N is formed between the fixing belt 20 and the pressure roller 21. The fixing device 9 further includes a driver that drives and rotates the pressure roller 21. As the pressure roller 21 rotates in the rotation direction D21, the fixing belt 20 is driven and rotated by the pressure roller 21.

Since the fixing belt 20 is driven and rotated by the pressure roller 21, the fixing belt 20 has a diameter (e.g., a belt diameter) that is greater than sizes of interior elements such as the heater 22 and the heater holder 23 that are disposed within a loop formed by the fixing belt 20. As the belt diameter of the fixing belt 20 increases, change in an orbit of the fixing belt 20 also increases. However, the fixing device 9 according to the embodiment further includes the separation plate 310 described below with reference to FIG. 7A. The separation plate 310 pivots in accordance with motion of the outer circumferential face of the fixing belt 20. Hence, the separation plate 310 separates the sheet P from the fixing belt 20 stably.

The heater 22 is a laminated heater that extends in a longitudinal direction thereof throughout an entire span of the fixing belt 20 in a longitudinal direction of the fixing belt 20. The heater 22 includes a base 30 that is platy, resistive heat generators 31 that are disposed on the base 30, and an insulating layer 32 that coats the resistive heat generators 31. The insulating layer 32 of the heater 22 contacts the inner circumferential face 20*d* of the fixing belt 20. The resistive heat generators 31 generate heat that is conducted to the fixing belt 20 through the insulating layer 32.

According to the embodiment, the base 30 includes a fixing belt opposed face that is disposed opposite the fixing belt 20 and the fixing nip N. The fixing belt opposed face mounts the resistive heat generators 31 and the insulating layer 32. Alternatively, the resistive heat generators 31 and the insulating layer 32 may be mounted on a heater holder opposed face of the base 30, that is disposed opposite the heater holder 23. In this case, heat generated by the resistive heat generators 31 is conducted to the fixing belt 20 through the base 30. Hence, the base 30 is preferably made of a material having an increased thermal conductivity, such as aluminum nitride. The base 30 made of the material having the increased thermal conductivity causes the resistive heat generators 31 to heat the fixing belt 20 sufficiently, even if the resistive heat generators 31 are disposed on the heater holder opposed face of the base 30.

The heater holder 23 and the stay 24 are disposed within the loop formed by the fixing belt 20. The stay 24 includes a channel made of metal. The stay 24 has both lateral ends in a longitudinal direction thereof, that are supported by side plates of the fixing device 9, respectively. Since the stay 24 supports the heater holder 23 and the heater 22 supported by the heater holder 23, in a state in which the pressure roller 21 is pressed against the fixing belt 20, the heater 22 receives pressure from the pressure roller 21 precisely to form the fixing nip N stably.

Since the heater holder 23 is subject to high temperatures by heat from the heater 22, the heater holder 23 is preferably made of a heat-resistant material. For example, if the heater holder 23 is made of heat-resistant resin having a decreased thermal conductivity, such as liquid crystal polymer (LCP), the heater holder 23 suppresses conduction of heat thereto from the heater 22, facilitating heating of the fixing belt 20.

In order to decrease a contact area where the heater holder 23 contacts the heater 22 and thereby reduce an amount of heat conducted from the heater 22 to the heater holder 23, the heater holder 23 includes a plurality of projections 23*a* that contacts the base 30 of the heater 22. According to the embodiment, the projections 23*a* of the heater holder 23 do not contact a part of the heater holder opposed face of the base 30, which is opposite to the resistive heat generators 31 mounted on the fixing belt opposed face of the base 30, that is, a part of the base 30, which is susceptible to temperature increase, thus decreasing the amount of heat conducted to the heater holder 23 further and causing the heater 22 to heat the fixing belt 20 efficiently.

The heater holder 23 mounts guides 26 that guide the fixing belt 20. The guides 26 are disposed upstream from and below the heater 22 and disposed downstream from and above the heater 22 in FIG. 2, respectively, in the rotation direction D20 of the fixing belt 20.

Figure 3:
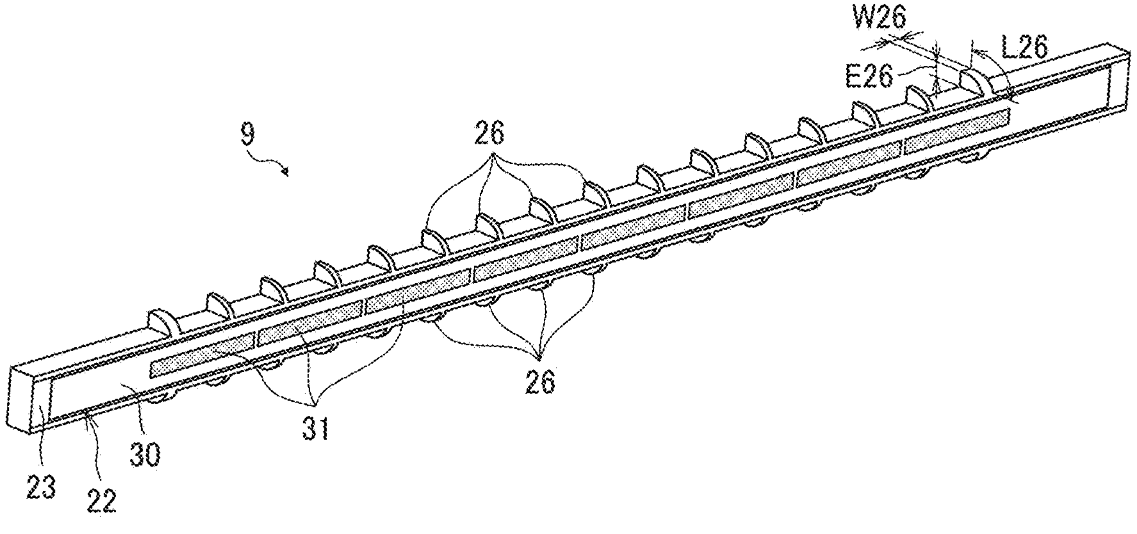
FIG. 3 is a perspective view of a heater, a heater holder, and guides incorporated in the fixing device depicted in FIG. 2.

As illustrated in FIG. 3, the plurality of guides 26 disposed upstream and downstream from the heater 22 in the rotation direction D20 of the fixing belt 20 is arranged in the longitudinal direction of the heater 22, that is, the longitudinal direction of the fixing belt 20, with a gap between the adjacent guides 26. Each of the guides 26 is substantially fan-shaped. As illustrated in FIG. 2, each of the guides 26 includes a fixing belt opposed face 260 that is disposed opposite the inner circumferential face 20*d* of the fixing belt 20 and defines an arc or a projecting curved face that extends in a circumferential direction of the fixing belt 20. As illustrated in FIG. 3, according to the embodiment, each of the guides 26 disposed opposite both lateral ends of the heater 22 in the longitudinal direction thereof has a width W26 that is greater than a width W26 of each of other guides 26. However, each of the guides 26 has a length L26 (e.g., a circumferential length) in the circumferential direction of the fixing belt 20 and a height E26, which are common.

In the fixing device 9 according to the embodiment, when printing starts, the driver drives and rotates the pressure roller 21 and the fixing belt 20 starts rotation in accordance with rotation of the pressure roller 21. Since the inner circumferential face 20*d* of the fixing belt 20 is contacted and guided by the fixing belt opposed face 260 of each of the guides 26, the fixing belt 20 rotates stably and smoothly.

Additionally, as power is supplied to the resistive heat generators 31 of the heater 22, the heater 22 heats the fixing belt 20. In a state in which the temperature of the fixing belt 20 reaches a predetermined target temperature (e.g., a fixing temperature), as a sheet P bearing an unfixed toner image is conveyed through the fixing nip N formed between the fixing belt 20 and the pressure roller 21 in the sheet conveyance direction DP as illustrated in FIG. 2, the fixing belt 20 and the pressure roller 21 fix the unfixed toner image on the sheet P under heat and pressure.

A description is provided of a construction of the heater 22.

Figure 4:
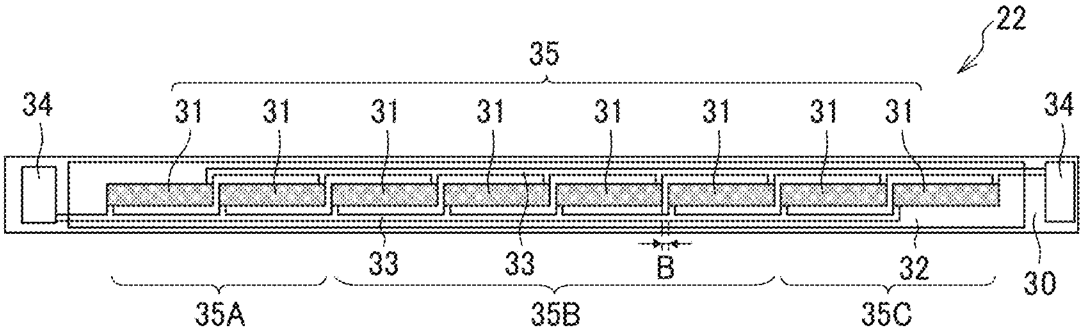
FIG. 4 is a plan view of the heater depicted in FIG. 3.

FIG. 4 is a plan view of the heater 22 according to the embodiment. As illustrated in FIG. 4, the heater 22 according to the embodiment includes the plurality of resistive heat generators 31 arranged in the longitudinal direction of the heater 22, that is, the longitudinal direction of the fixing belt 20, with a gap B between the adjacent resistive heat generators 31.

In other words, the heater 22 includes a heat generation portion 35 that is divided into the plurality of resistive heat generators 31 arranged in the longitudinal direction of the fixing belt 20. The heat generation portion 35 may be divided into at least three or four parts that construct heat generation portions 35A and 35C serving as lateral end heating portions and a heat generation portion 35B serving as a center heating portion. The heat generation portions 35A and 35C are disposed opposite and heat both lateral end spans of the fixing belt 20 in the longitudinal direction thereof, respectively. The heat generation portion 35B is disposed opposite and heats a center span of the fixing belt 20 in the longitudinal direction thereof.

If the heat generation portion 35 of the heater 22 is divided into the plurality of resistive heat generators 31, the heater 22 has an increased length in the sheet conveyance direction DP. Accordingly, the fixing nip N has an increased length in the sheet conveyance direction DP. Consequently, the fixing belt 20 is more subject to deformation, increasing change in the orbit of the fixing belt 20. However, the fixing device 9 according to the embodiment includes the separation plate 310 described below with reference to FIG. 7A. The separation plate 310 pivots in accordance with motion of the outer circumferential face of the fixing belt 20. Hence, the fixing device 9 properly employs the heater 22 incorporating the heat generation portion 35 that is divided into the plurality of resistive heat generators 31.

The resistive heat generators 31 are electrically connected in parallel to a pair of electrodes 34 through a plurality of feeders 33. The electrodes 34 are mounted on both lateral ends of the base 30 in a longitudinal direction thereof, respectively. Each of the feeders 33 is made of a conductor having a resistance value smaller than a resistance value of the resistive heat generator 31.

The adjacent resistive heat generators 31 define the gap B therebetween, that is 0.2 mm or greater, preferably 0.4 mm or greater, in view of ensuring insulation between the adjacent resistive heat generators 31. If the gap B between the adjacent resistive heat generators 31 is excessively great, the fixing belt 20 is subject to temperature decrease at an opposed portion thereof that is disposed opposite the gap B. Hence, the gap B is 5 mm or smaller, preferably 1 mm or smaller, in view of suppressing uneven temperature of the fixing belt 20 in the longitudinal direction thereof.

The resistive heat generators 31 are made of a material having a positive temperature coefficient (PTC) property that is characterized in that the resistance value increases, that is, a heater output decreases, as the temperature increases. Accordingly, if a sheet P having a decreased width that is smaller than an entire length of the heat generation portion 35 in a longitudinal direction thereof is conveyed through the fixing nip N, for example, since the sheet P does not draw heat from the fixing belt 20 in an outboard span that is outboard from the sheet P in the longitudinal direction of the fixing belt 20, the resistive heat generators 31 in the outboard span are subject to temperature increase.

Since a constant voltage is applied to the resistive heat generators 31, when the temperature of the resistive heat generators 31 in the outboard span increases and the resistance value thereof increases, conversely, an output (e.g., a heat generation amount) from the resistive heat generators 31 decreases relatively, suppressing temperature increase of the resistive heat generators 31 that are disposed in both lateral end spans of the heat generation portion 35 in the longitudinal direction thereof. Additionally, the plurality of resistive heat generators 31 is electrically connected in parallel, suppressing temperature increase in a non-conveyance span where the sheet P is not conveyed over the fixing belt 20 while retaining the printing speed.

Alternatively, the heat generation portion 35 may include heat generators other than the resistive heat generators 31 having the PTC property. As illustrated in FIG. 4, the resistive heat generators 31 are aligned in the longitudinal direction of the heater 22 to define a single column in a short direction of the heater 22. Alternatively, the resistive heat generators 31 may define a plurality of columns in the short direction of the heater 22.

For example, the resistive heat generator 31 is produced as below. Silver-palladium (AgPd), glass powder, and the like are mixed into paste. The paste coats the base 30 by screen printing or the like. Thereafter, the base 30 is subject to firing. According to the embodiment, the resistive heat generator 31 has a resistance value of 80 Ω at an ambient temperature.

Alternatively, the resistive heat generator 31 may be made of a resistive material such as a silver alloy (AgPt) and ruthenium oxide ($RuO_2$). The feeders 33 and the electrodes 34 are made of a material prepared with silver (Ag) or silver-palladium (AgPd) by screen printing or the like.

The base 30 is preferably made of ceramics, such as alumina and aluminum nitride, or a nonmetallic material, such as glass and mica, having an enhanced heat resistance and an enhanced insulation. According to the embodiment, the base 30 is made of alumina and has a short width of 8 mm, a longitudinal length of 270 mm, and a thickness of 1.0 mm.

Alternatively, the base 30 may include a conductive layer made of metal or the like and an insulating layer disposed on the conductive layer. The metal is preferably aluminum, stainless steel, or the like that is available at reduced costs. In order to improve evenness of heat conducted from the heater 22 so as to enhance quality of an image formed on a sheet P, the base 30 may be made of a material that has an increased thermal conductivity such as copper, graphite, and graphene.

The insulating layer 32 is made of heat-resistant glass and has a thickness of 75 μm, for example. The insulating layer 32 covers the resistive heat generators 31 and the feeders 33 and insulates and protects the resistive heat generators 31 and the feeders 33 while retaining smooth sliding of the fixing belt 20 over the heater 22.

Figure 5:
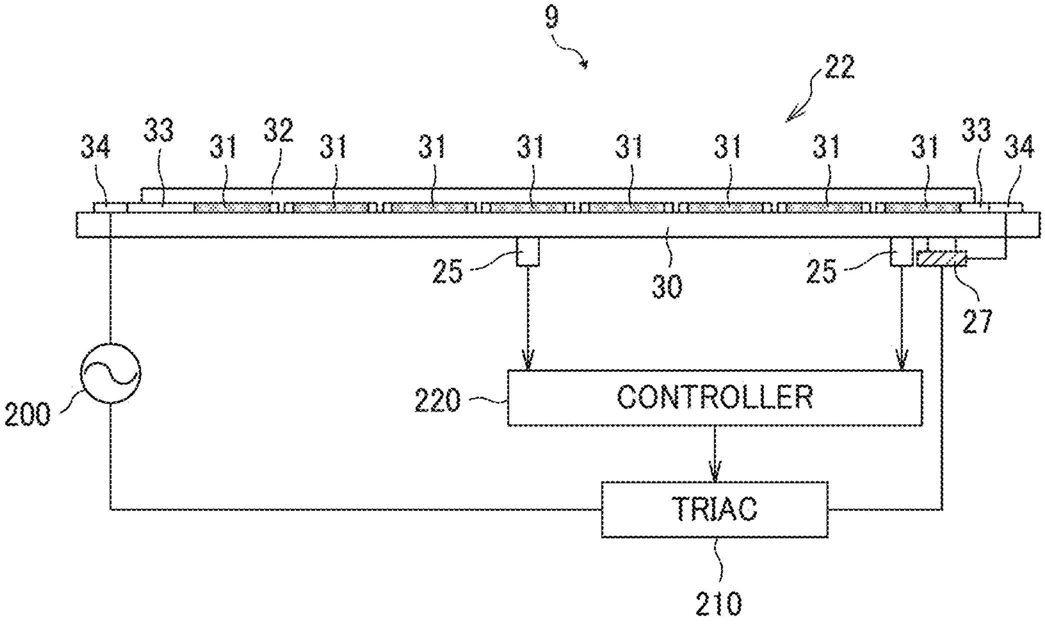
FIG. 5 is a diagram of a power supply circuit that supplies power to the heater depicted in FIG. 4.

FIG. 5 is a diagram of the heater 22 according to the embodiment, illustrating a power supply circuit that supplies power to the heater 22.

As illustrated in FIG. 5, according to the embodiment, the power supply circuit for supplying power to the resistive heat generators 31 includes an alternating current power supply 200 that is electrically connected to the electrodes 34 of the heater 22. The power supply circuit further includes a triac 210 that controls an amount of power supplied to the resistive heat generators 31.

The power supply circuit further includes a controller 220 that controls the amount of power supplied to the resistive heat generators 31 through the triac 210 based on temperatures of the heater 22, that are detected by the thermistors 25 serving as the temperature detectors, respectively. The controller 220 includes a microcomputer that includes a central processing unit (CPU), a read only memory (ROM), a random access memory (RAM), and an input-output (I/O) interface.

According to the embodiment, the thermistors 25 serving as the temperature detectors are disposed opposite a center span of the heater 22 in the longitudinal direction thereof, that is, a minimum sheet conveyance span where a minimum size sheet P available in the fixing device 9 is conveyed, and one lateral end span of the heater 22 in the longitudinal direction thereof, respectively. Further, a thermostat 27 serving as a breaker is disposed opposite one lateral end span of the heater 22 in the longitudinal direction thereof. The thermostat 27 interrupts supplying power to the resistive heat generators 31 when a temperature of the resistive heat generator 31 is a predetermined temperature or higher. The thermistors 25 and the thermostat 27 contact a back face of the base 30, which is opposite to a front face of the base 30, which mounts the resistive heat generators 31. Each of the thermistors 25 and the thermostat 27 detects the temperature of the resistive heat generator 31.

Figure 6:
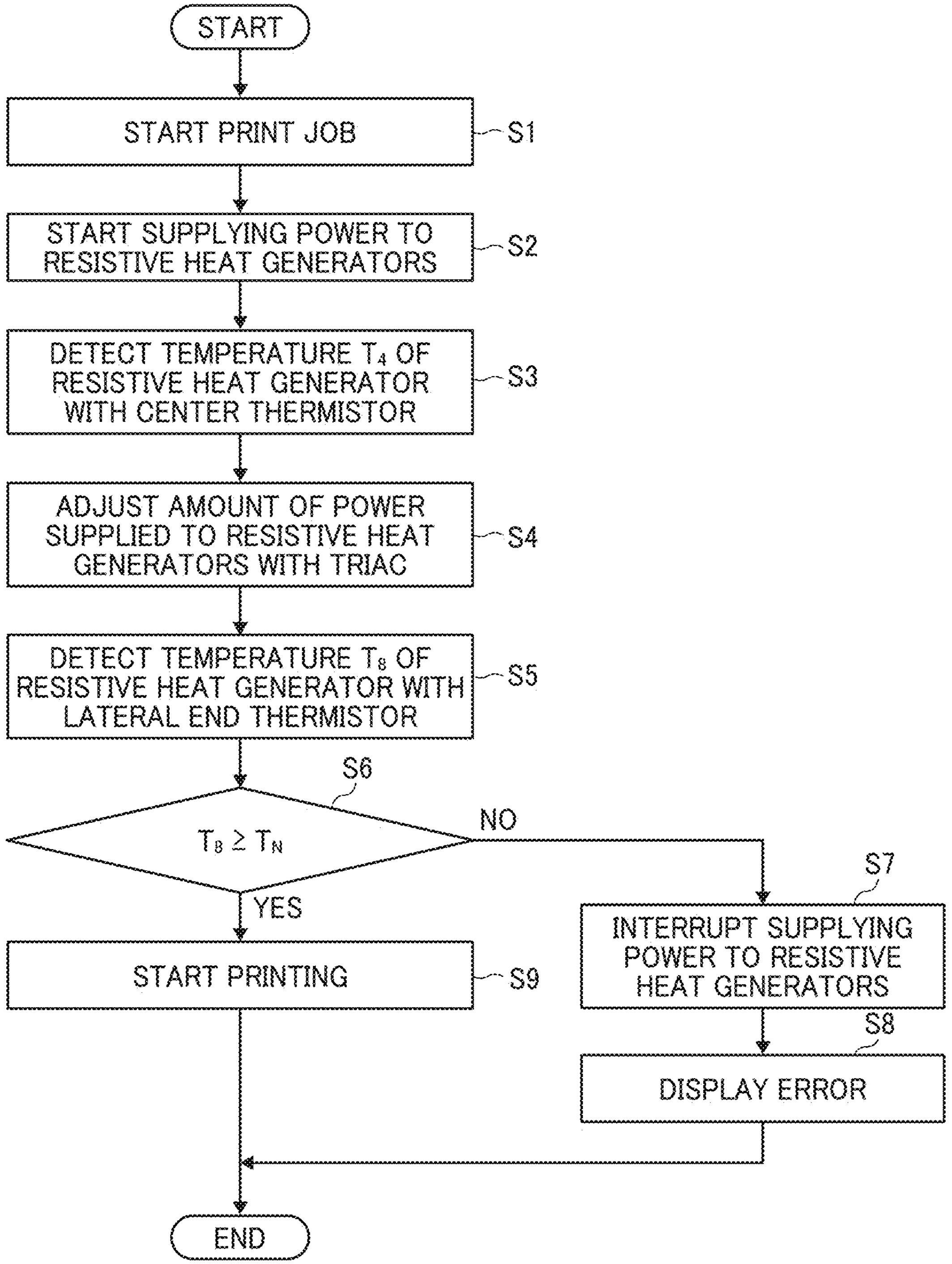
FIG. 6 is a flowchart illustrating control processes for controlling the heater depicted in FIG. 5.

Referring to FIG. 6 illustrating a flowchart, a description is provided of control processes for controlling the heater 22 according to the embodiment.

As illustrated in FIG. 6, in step S1, the image forming apparatus 100 starts a print job. In step S2, the controller 220 causes the alternating current power supply 200 to start supplying power to the resistive heat generators 31 of the heater 22.

Accordingly, the resistive heat generators 31 start generating heat, heating the fixing belt 20. In step S3, the thermistor 25, that is, a center thermistor, disposed opposite the center span of the heater 22 in the longitudinal direction thereof, detects a temperature $T_4$ of the resistive heat generator 31 disposed in the center span of the heater 22 in the longitudinal direction thereof. In step S4, based on the temperature $T_4$ sent from the thermistor 25, that is, the center thermistor, the controller 220 controls the triac 210 to adjust the amount of power supplied to the resistive heat generators 31 so that the resistive heat generators 31 attain a predetermined temperature.

Simultaneously, in step S5, the thermistor 25, that is, a lateral end thermistor, disposed opposite the lateral end span of the heater 22 in the longitudinal direction thereof, also detects a temperature $T_8$ of the resistive heat generator 31 disposed in the lateral end span of the heater 22 in the longitudinal direction thereof. In step S6, the controller 220 determines whether or not the temperature $T_8$ of the resistive heat generator 31, that is detected by the thermistor 25 serving as the lateral end thermistor, is a predetermined temperature $T_N$ or higher ($T_8 \geq T_N$). If the controller 220 determines that the temperature $T_8$ of the resistive heat generator 31 is lower than the predetermined temperature $T_N$ (NO in step S6), the controller 220 determines that an abnormally decreased temperature (e.g., disconnection) generates and interrupts supplying power to the resistive heat generators 31 of the heater 22 in step S7. In step S8, the controller 220 causes a control panel of the image forming apparatus 100 to display an error. Conversely, if the controller 220 determines that the temperature $T_8$ of the resistive heat generator 31, that is detected by the thermistor 25, is the predetermined temperature $T_N$ or higher (YES in step S6), the controller 220 determines that no abnormally decreased temperature generates and starts printing in step S9.

If the controller 220 does not perform temperature control based on the temperature detected by the thermistor 25, that is, the center thermistor, due to breakage, disconnection, or the like of the resistive heat generator 31, the resistive heat generator 31 disposed in the lateral end span of the heater 22 in the longitudinal direction thereof and other resistive heat generators 31 may suffer from an abnormally increased temperature (e.g., overheating). In this case, when the temperature of the resistive heat generator 31 reaches the predetermined temperature $T_N$ or higher, the controller 220 activates the thermostat 27 to interrupt supplying power to the resistive heat generators 31, preventing the resistive heat generators 31 from suffering from the abnormally increased temperature.

A description is provided of a construction of the sheet separation assembly 300 incorporated in the fixing device 9.

Figure 7A:
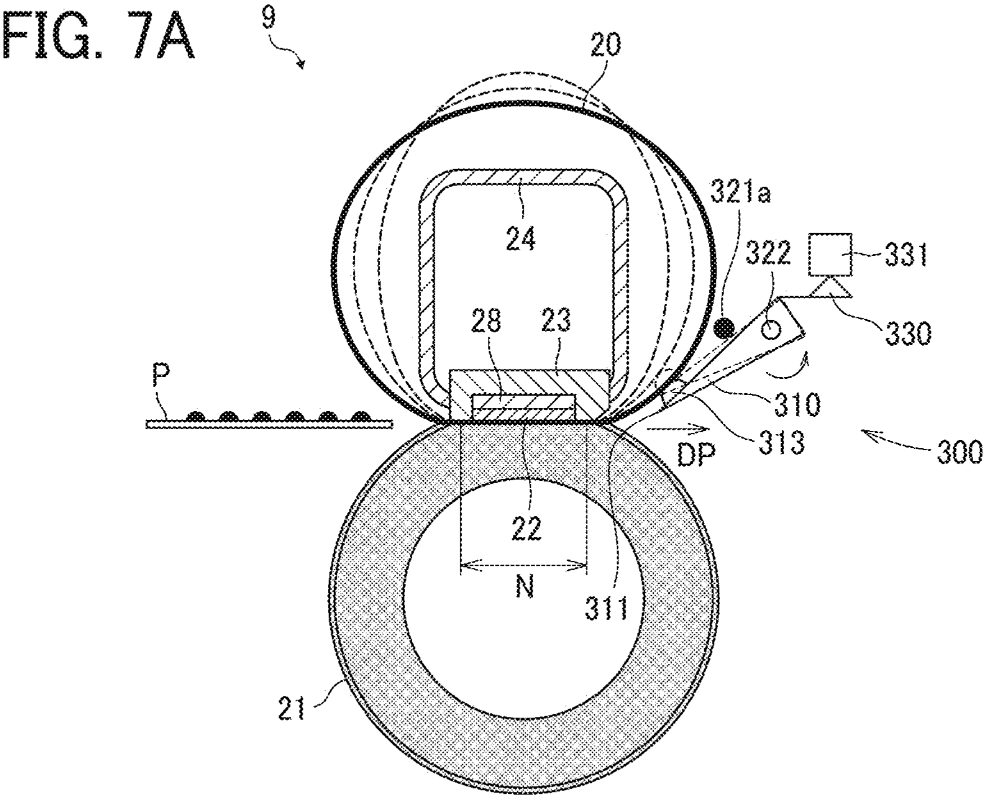
FIG. 7A is a cross-sectional view of the fixing device depicted in FIG. 2, illustrating a sheet separation assembly incorporated therein.

FIG. 7A is a schematic cross-sectional view of the fixing device 9 incorporating the sheet separation assembly 300 that separates the sheet P that has passed through the fixing nip N from the fixing belt 20. The sheet separation assembly 300 includes the separation plate 310 serving as a separator or a sheet separator disposed downstream from the fixing nip N in the sheet conveyance direction DP and disposed on the right of the fixing nip N in FIG. 7A. The separation plate 310 separates the sheet P from the fixing belt 20.

The separation plate 310 is made of heat-resistant metal or heat-resistant resin. For example, the heat-resistant metal is stainless steel. The heat-resistant resin is polyimide, PEEK, or the like. Alternatively, the separation plate 310 may be made of a material other than metal and resin as long as the material is heat-resistant.

Figure 7B:
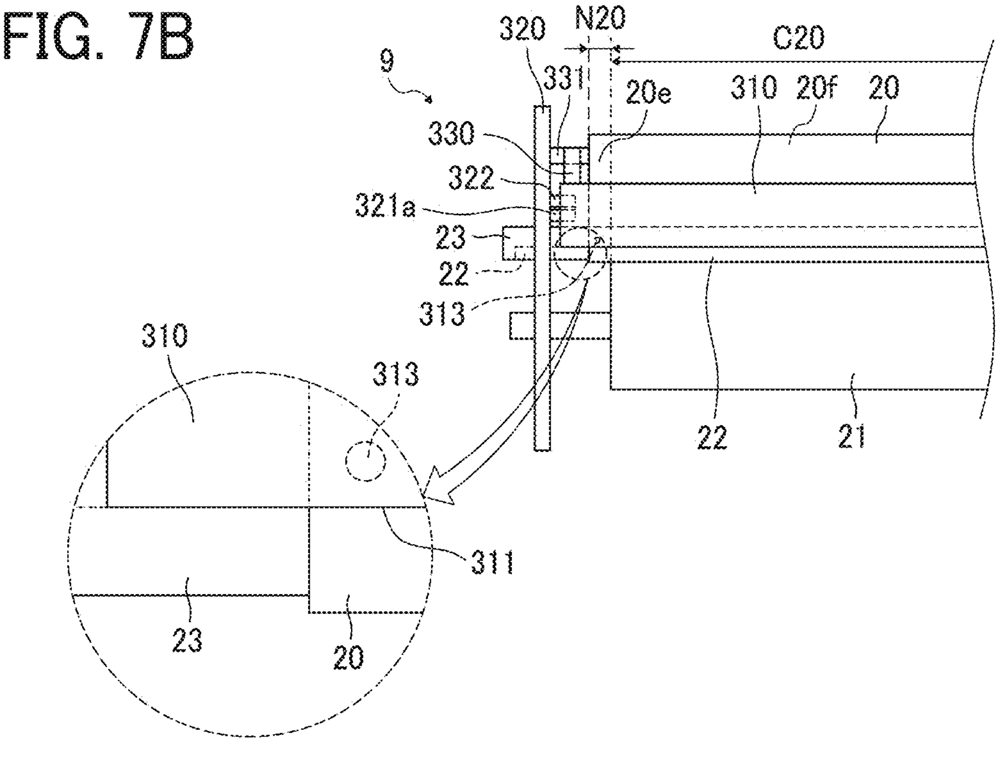
FIG. 7B is a front view of the fixing device depicted in FIG. 7A.

The separation plate 310 is not installed stationarily in the fixing device 9. The separation plate 310 moves toward and away from the fixing belt 20. For example, the separation plate 310 extends parallel to an axial direction, that is, the longitudinal direction, of the fixing belt 20. The separation plate 310 is greater than the sheet P in the axial direction of the fixing belt 20. As illustrated in FIG. 7B, the fixing device 9 further includes a pair of side plates 320. The sheet separation assembly 300 further includes a separation shaft 322. The separation shaft 322 projects from an inner face of each of the side plates 320. The separation plate 310 includes each lateral end in a longitudinal direction thereof, that is supported by the separation shaft 322 such that the separation plate 310 pivots about the separation shaft 322.

The separation plate 310 further includes an edge portion 311 serving as a non-contact portion that does not contact the fixing belt 20. The separation plate 310 pivots about the separation shaft 322 such that the edge portion 311 moves in an approach-separation direction in which the edge portion 311 approaches and separates from the outer circumferential face of the fixing belt 20. The sheet separation assembly 300 further includes a flat spring 330 serving as a biasing member that is attached to an opposite end of the separation plate 310, that is opposite to the edge portion 311 via the separation shaft 322.

The sheet separation assembly 300 further includes a flat spring support 331 that projects from the inner face of the side plate 320. The flat spring 330 contacts the flat spring support 331 such that the flat spring 330 presses against and biases the flat spring support 331. Accordingly, a reactive force generated by pressure and bias from the flat spring 330 biases and pivots the separation plate 310 about the separation shaft 322 clockwise in FIG. 7A.

Figure 7C:
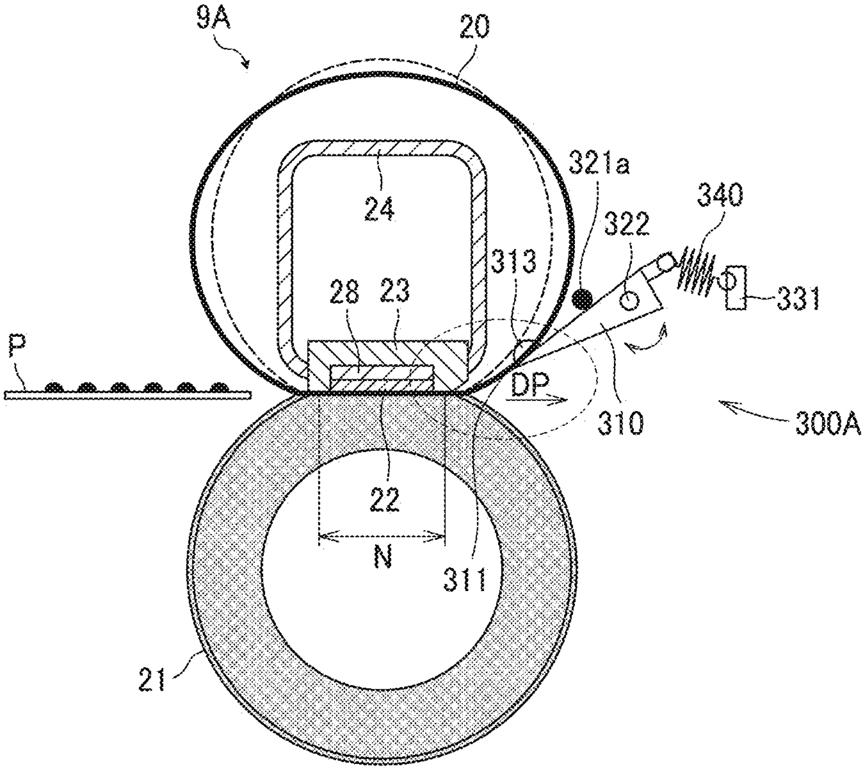
FIG. 7C is a cross-sectional view of a fixing device according to another embodiment of the present disclosure that is installable in the image forming apparatus depicted in FIG. 1, illustrating a sheet separation assembly incorporated in the fixing device as a modification example of the sheet separation assembly depicted in FIG. 7A.

A mechanism that biases and pivots the separation plate 310 is not limited to the flat spring 330. As illustrated in FIG. 7C, a fixing device 9A includes the sheet separation assembly 300A employing a tension spring 340 instead of the flat spring 330. The tension spring 340 serves as a biasing member stretched between a rear end of the separation plate 310 and the flat spring support 331.

A description is provided of a configuration of a restrictor incorporated in the fixing device 9A.

FIG. 7C illustrates the fixing belt 20 that rotates with a chain line and the fixing belt 20 that interrupts rotation with a bold line. As illustrated in FIG. 7C, the fixing device 9A further includes a restrictor 321*a* that projects from the inner face of each of the side plates 320 and is disposed in proximity to the separation shaft 322. A part of the side plate 320 is extended and combined with or molded into the restrictor 321*a*. Since the side plate 320 is made of metal, the restrictor 321*a* has enhanced rigidity. Instead of being molded with the side plate 320, the restrictor 321*a* may be secured to the side plate 320. The restrictor 321*a* serves as a metal part that is separated from the side plate 320 and has enhanced mechanical strength, for example.

Since the sheet separation assembly 300A incorporates the restrictor 321*a*, as the separation plate 310 pivots clockwise in FIG. 7C for a predetermined amount or greater in an approach direction in which the separation plate 310 approaches the fixing belt 20, the separation plate 310 comes into contact with the restrictor 321*a* that restricts pivoting of the separation plate 310. Since the restrictor 321*a* restricts pivoting of the separation plate 310, when an operator (e.g., a user or a service engineer) removes a sheet P that is jammed and wound around the fixing belt 20, the restrictor 321*a* prohibits the operator from pressing the separation plate 310 toward the fixing belt 20 excessively. Thus, the restrictor 321*a* prevents the separation plate 310 from coming into contact with the fixing belt 20 and damaging the outer circumferential face of the fixing belt 20.

A description is provided of a configuration of a first comparative fixing device.

The first comparative fixing device includes a restrictor that restricts motion of a separator and is mounted on a flange. When an excessively great force imposed on the separator is transmitted to the flange through the restrictor, the flange may be inclined inward substantially. Accordingly, the flange may warp and damage one lateral end of a fixing belt in a longitudinal direction thereof.

The separator disposed in proximity to the fixing belt separates a sheet from the fixing belt. If a clearance between the fixing belt and the separator is excessively small, the separator may come into contact with the fixing belt, damaging the fixing belt easily and resulting in formation of a faulty image.

If the clearance between the fixing belt and the separator is excessively great, the sheet may pass through the great clearance and may be wound around the fixing belt, causing the sheet to be jammed easily. Hence, the separator is requested to be closer to the fixing belt without contacting the fixing belt.

In order to retain a slight clearance between the separator and the fixing belt, the separator includes contact portions that are disposed at both lateral ends of the separator in a longitudinal direction thereof, respectively, and disposed outboard from a conveyance span where the sheet serving as a conveyed object is conveyed. The contact portions contact a circumferential face of the fixing belt. The flanges support the fixing belt at both lateral ends of the fixing belt in the longitudinal direction thereof, respectively, such that the fixing belt slides over the flanges. A restrictor is mounted on a part of each of the flanges and prohibits the separator from approaching the fixing belt excessively.

When the operator removes the jammed sheet, for example, even if the separator is exerted with a force that moves the separator closer to the fixing belt beyond the clearance between the separator and the fixing belt, the separator comes into contact with the restrictor that restricts motion of the separator toward the fixing belt. Thus, the restrictor prevents failures that the separator damages the fixing belt.

When the operator removes the jammed sheet, for example, the separator is subject to reception of an excessively great force. The separator may be exerted with the excessively great force at one lateral end of the separator in the longitudinal direction thereof asymmetrically to another lateral end of the separator in the longitudinal direction thereof.

When the excessively great force imposed on one lateral end of the separator in the longitudinal direction thereof tilts the flange disposed opposite one lateral end of the fixing belt in the longitudinal direction thereof inward via one of the restrictors, the flange may be inclined substantially, warping and damaging one lateral end of the fixing belt in the longitudinal direction thereof.

To address the above-described circumstances of the first comparative fixing device, the fixing device 9 according to the embodiment depicted in FIG. 7B incorporates the restrictor 321*a* mounted on the side plate 320 serving as a housing of the fixing device 9. Accordingly, even if a force is imposed on the restrictor 321*a* through one lateral end of the separation plate 310 asymmetrically to another lateral end of the separation plate 310 in the longitudinal direction thereof, the force does not tilt the flange inward substantially. Thus, the flange does not warp and damage one lateral end of the fixing belt 20 in the longitudinal direction thereof.

As illustrated in FIG. 7B, the restrictor 321*a* is mounted on the inner face of the side plate 320 disposed at each lateral end of the fixing device 9 in a longitudinal direction thereof.

Figure 7D:
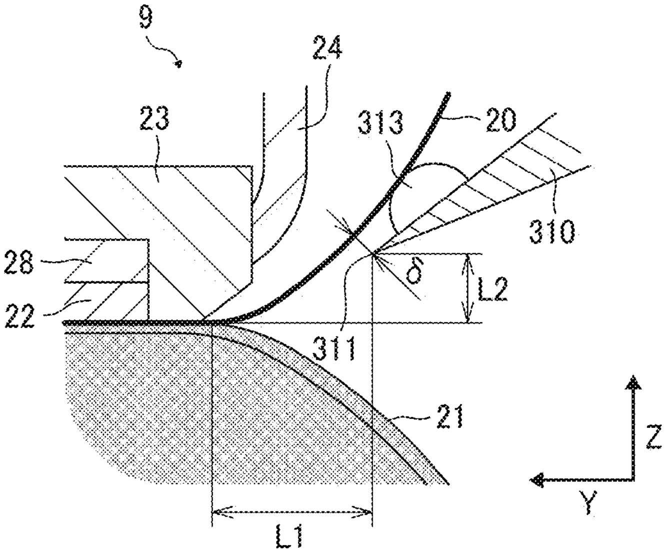
FIG. 7D is a partially enlarged cross-sectional view of the fixing device depicted in FIG. 7A.
Figure 7E:
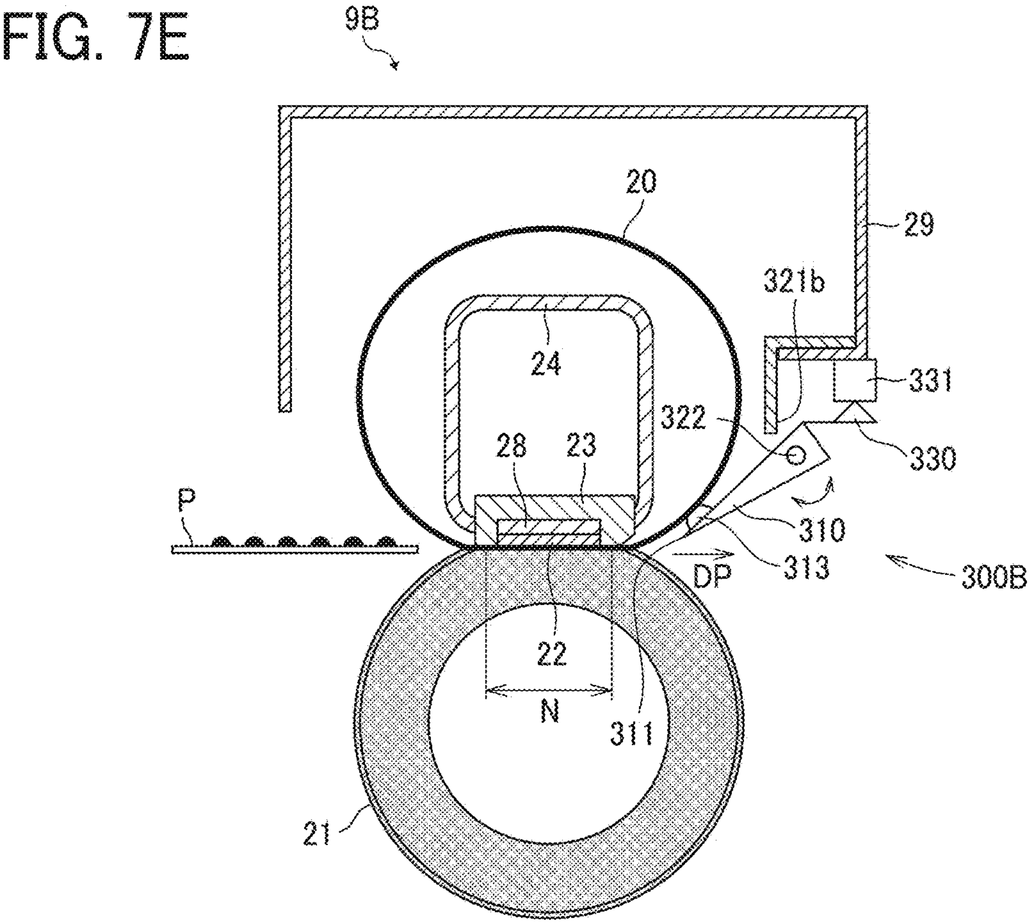
FIG. 7E is a cross-sectional view of a fixing device according to yet another embodiment of the present disclosure that is installable in the image forming apparatus depicted in FIG. 1, illustrating a sheet separation assembly incorporated in the fixing device as another modification example of the sheet separation assembly depicted in FIG. 7A.
Figure 7F:
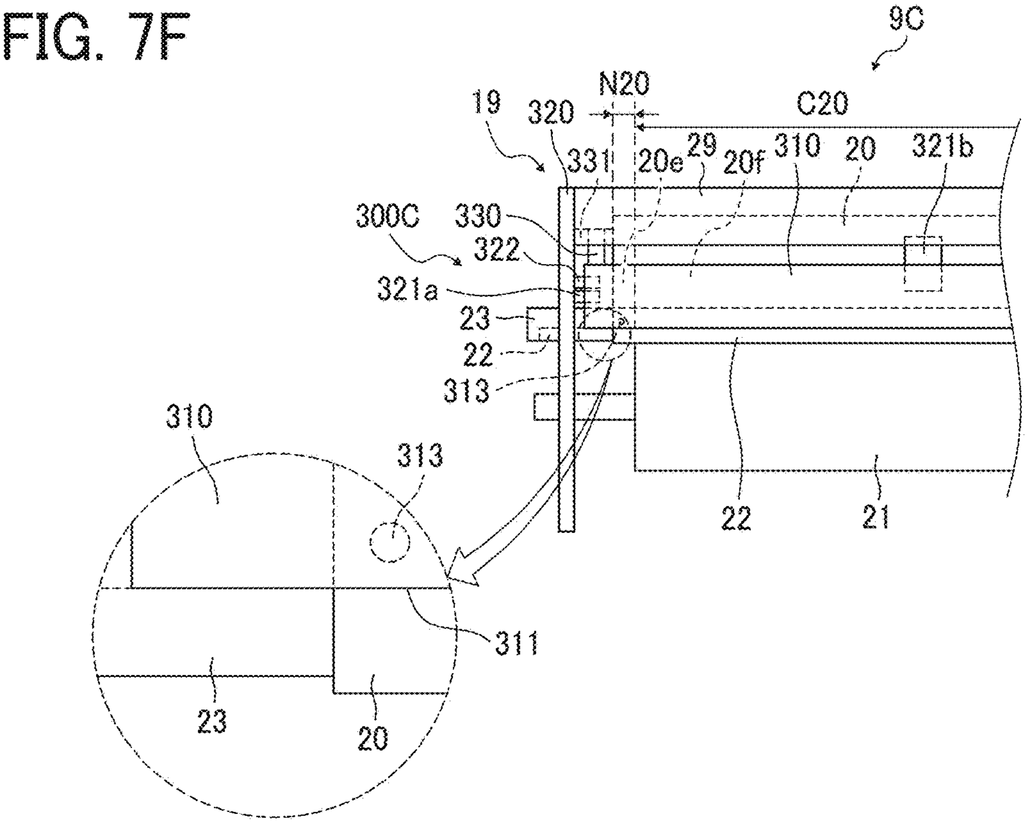
FIG. 7F is a front view of a fixing device according to yet another embodiment of the present disclosure that is installable in the image forming apparatus depicted in FIG. 1, illustrating a sheet separation assembly incorporated in the fixing device as yet another modification example of the sheet separation assembly depicted in FIG. 7A.

Alternatively, as illustrated in FIG. 7E, a fixing device 9B includes the sheet separation assembly 300B including a restrictor 321*b* that is mounted on a frame 29 at one or more positions on an intermediate portion of the frame 29 in a longitudinal direction thereof. A part of the frame 29 is extended and combined with or molded into the restrictor 321*b*. FIG. 7E illustrates the fixing belt 20 that interrupts rotation with a bold line. As illustrated in FIG. 7F, a fixing device 9C includes a housing 19, a part of which is constructed by the frame 29 serving as a rear wall and the side plate 320.

The fixing device 9C further includes the sheet separation assembly 300C including both the restrictors 321*a* and 321*b*. Since the restrictors 321*a* and 321*b* are molded with the side plate 320 and the frame 29, respectively, the restrictors 321*a* and 321*b* are manufactured at reduced costs without increase in a number of parts.

Since the separation plate 310 is narrow and long, if the separation plate 310 is made of a thin plate, the separation plate 310 is subject to deformation by warping. If the restrictor 321*a* contacts each lateral end of the separation plate 310 in the longitudinal direction thereof to restrict motion of the separation plate 310, the restrictor 321*a* may not restrict motion of an intermediate portion of the separation plate 310 in the longitudinal direction thereof stably. If the restrictor 321*b* is mounted on the frame 29 at one or more positions on the intermediate portion of the frame 29 in the longitudinal direction thereof, the restrictor 321*b* restricts motion of the intermediate portion of the separation plate 310 in the longitudinal direction thereof stably.

A description is provided of a configuration of a contact portion of the fixing device 9.

As illustrated in FIGS. 7B and 7F, the separation plate 310 includes contact portions 313 disposed in proximity to the edge portion 311. The contact portion 313 is disposed in each lateral end span of the separation plate 310 in the longitudinal direction thereof. A biasing force generated by the flat spring 330 brings the contact portion 313 into contact with the outer circumferential face of the fixing belt 20 in a non-conveyance span N20 where the sheet P is not conveyed, that is, each lateral end span in the axial direction of the fixing belt 20. For example, the fixing belt 20 includes a non-conveyance portion 20*e* having the non-conveyance span N20 and a conveyance portion 20*f* having a conveyance span C20 where the sheet P is conveyed. The non-conveyance portion 20*e* is disposed outboard from the conveyance portion 20*f* in the axial direction of the fixing belt 20. The contact portion 313 contacts the outer circumferential face of the fixing belt 20 in the non-conveyance portion 20*e*, that is, each lateral end span of the fixing belt 20 in the axial direction thereof. Hence, the contact portion 313 restricts a clearance δ between the edge portion 311 serving as the non-contact portion of the separation plate 310 and the fixing belt 20 to a predetermined size as illustrated in FIG. 7D. The contact portion 313 may be a part of the separation plate 310. Since the contact portion 313 contacts the outer circumferential face of the fixing belt 20, the contact portion 313 may be made of resin (e.g., fluororesin) that has heat resistance and abrasion resistance, an elastic body (e.g., fluororubber), or the like.

The contact portion 313 has a shape having a smooth surface, for example, a hemisphere. As the contact portion 313 has a semispherical shape that has the smooth surface, the contact portion 313 comes into contact with the outer circumferential face of the fixing belt 20 in each lateral end span in the longitudinal direction thereof softly. Thus, the contact portion 313 slides over the fixing belt 20 with decreased sliding friction and does not damage the fixing belt 20.

The contact portion 313 is disposed opposite the fixing belt 20 in a radial direction thereof, minimizing an amount of backlash of the fixing belt 20.

A description is provided of an approach position and a separation position of a nip formation pad or a nip former.

The heater 22 and the heater holder 23, each of which serves as the nip formation pad, move between the approach position and the separation position with respect to the pressure roller 21. The pressure roller 21 presses against the heater 22 and the heater holder 23 situated at the approach position at the fixing nip N. The pressure roller 21 releases pressure applied at the fixing nip N when the heater 22 and the heater holder 23 are situated at the separation position. The heater 22 and the heater holder 23 move vertically in FIG. 7A. In a state in which the restrictor 321*a* restricts pivoting of the separation plate 310, the heater 22 and the heater holder 23 move to the separation position.

A description is provided of a configuration of a housing of the fixing device 9, that is equivalent to the housing 19 depicted in FIG. 7F.

Figure 7G:
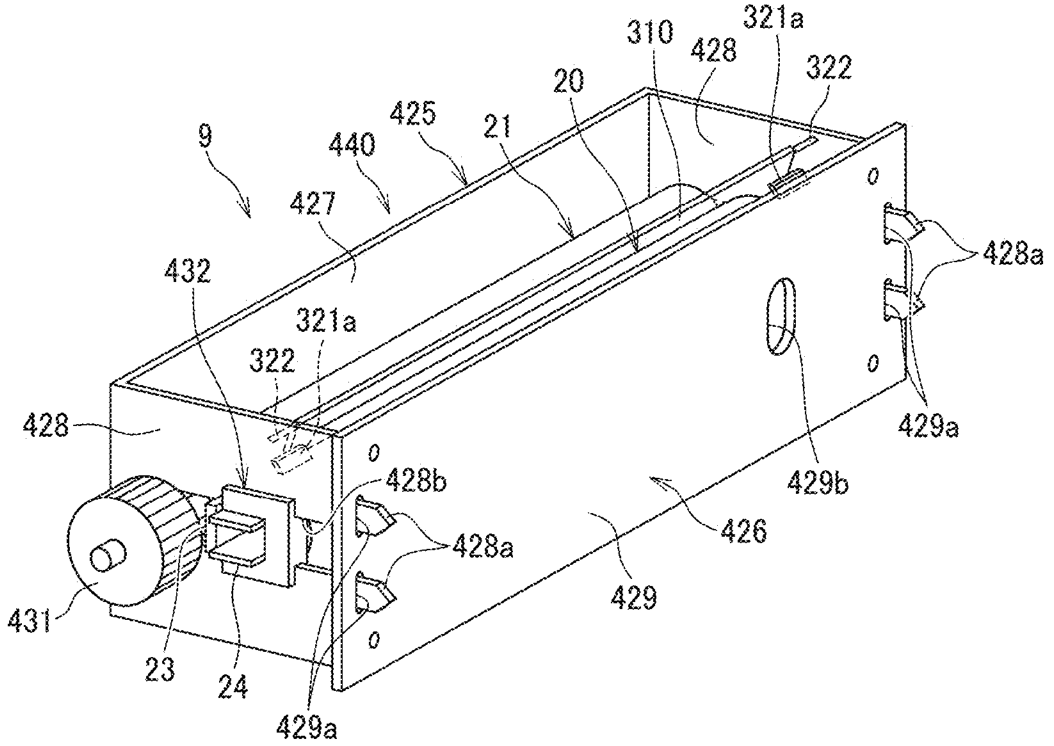
FIG. 7G is a perspective view of the fixing device depicted in FIG. 2.
Figure 7H:
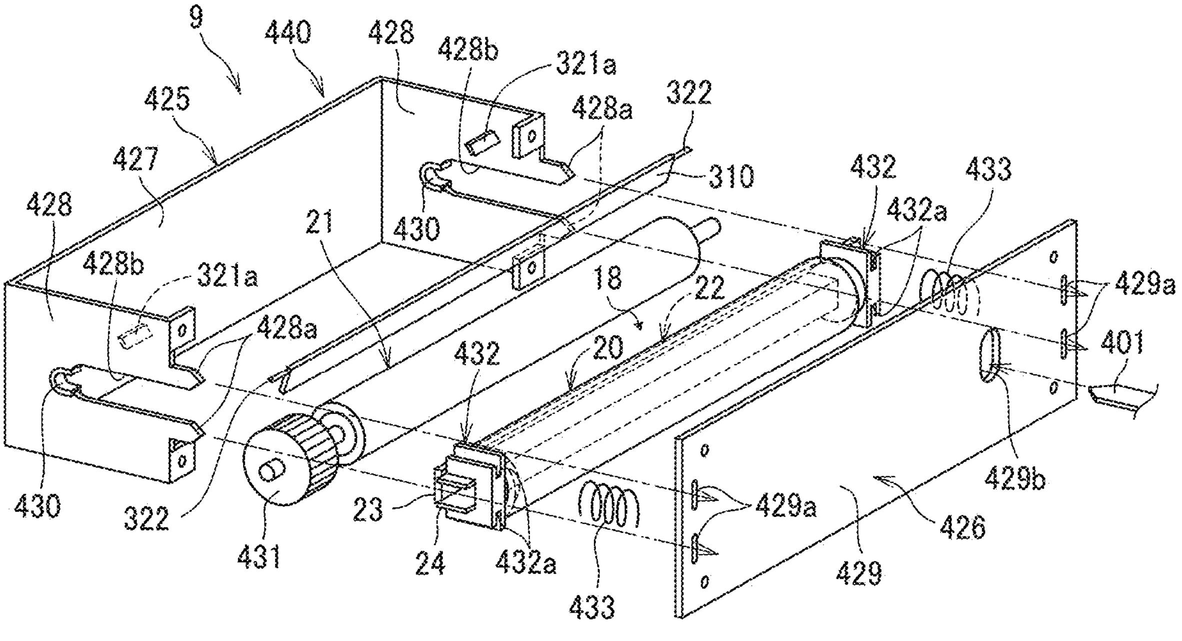
FIG. 7H is an exploded perspective view of the fixing device depicted in FIG. 7G.

Referring to FIGS. 7G and 7H illustrating the housing of the fixing device 9, a description is provided of a configuration that moves the heater 22 and the heater holder 23.

The fixing device 9 includes a device frame 440 serving as the housing. The device frame 440 includes a first device frame 425 constructed of a pair of side walls 428 and a front wall 427 and a second device frame 426 constructed of a rear wall 429.

As illustrated in FIG. 7H, the belt unit 18 includes the fixing belt 20, the heater 22, the heater holder 23, the stay 24, and a pair of supports 432. The housing supports the belt unit 18 and the pressure roller 21.

The device frame 440 constructed of the first device frame 425 and the second device frame 426 serves as the housing. Each of the side walls 428 is a part of the housing and serves as a side plate. The side walls 428 support the belt unit 18 and the pressure roller 21.

The front wall 427 combined with the side walls 428 is also a part of the housing. The rear wall 429 attached to the side walls 428 is also a part of the housing. Thus, the housing is not limited to a frame that supports the pressure roller 21 and the belt unit 18 directly. The housing also includes a frame molded and combined with the above-described frame and a frame attached to and combined with the above-described frame.

The separation plate 310 is interposed between the side walls 428 (e.g., a left side wall and a right side wall in FIG. 7G) and disposed in proximity to an exit of the fixing nip N formed between the fixing belt 20 and the pressure roller 21. The side walls 428 rotatably support the separation shafts 322 mounted on both lateral ends of the separation plate 310 in the longitudinal direction thereof, respectively. The side walls 428 mount the restrictors 321*a*, respectively.

The side wall 428 is equivalent to the side plate 320 depicted in FIG. 7F. The rear wall 429 is equivalent to the frame 29 depicted in FIG. 7F. A part of the side wall 428 is extended and combined with or molded into the restrictor 321*a*. A part of an intermediate portion of the rear wall 429 is extended and combined with or molded into the restrictor 321*b*. Since the side walls 428 and the rear wall 429 that construct the housing are made of metal, the restrictors 321*a* and 321*b* are combined or molded with the side walls 428 and the rear wall 429, respectively, to improve mechanical strength.

The restrictors 321*a* and 321*b* are combined or molded with the side walls 428 and the rear wall 429, respectively. Alternatively, the restrictors 321*a* and 321*b* may be secured to the side walls 428 and the rear wall 429, respectively, as separate parts. The rear wall 429 extends in the longitudinal direction of the fixing belt 20. The rear wall 429 is disposed opposite the pressure roller 21 via the fixing belt 20.

According to the embodiment, the restrictors 321*a* and 321*b* are mounted on the device frame 440 serving as the housing. Accordingly, even if the separation plate 310 is exerted with a substantial force, the restrictors 321*a* and 321*b* restrict motion of the separation plate 310 that moves closer to the fixing belt 20 precisely. The restrictors 321*a* and 321*b* prevent each of the supports 432 (e.g., flanges) from being exerted with an excessively great force. Thus, the restrictors 321*a* and 321*b* prevent the separation plate 310 from striking and warping the fixing belt 20 and thereby prevent damaging of the fixing belt 20.

The pair of side walls 428 is disposed opposite one lateral end and another lateral end of the fixing belt 20 in the longitudinal direction thereof, respectively. The side walls 428 support both lateral ends of each of the fixing belt 20, the pressure roller 21, the heater 22, and the heater holder 23, respectively, in the longitudinal direction of the fixing belt 20. Each of the side walls 428 includes a plurality of engaging projections 428*a*. As the engaging projections 428*a* engage coupling holes 429*a* penetrating through the rear wall 429, respectively, the first device frame 425 is coupled to the second device frame 426.

Each of the side walls 428 includes an insertion recess 428*b* through which a rotation shaft of the pressure roller 21 and the like are inserted. The insertion recess 428*b* is open at an opening that faces the rear wall 429 and closed at a bottom that is opposite to the opening and serves as a contact portion.

The fixing device 9 further includes a bearing 430 that supports the rotation shaft of the pressure roller 21 and is disposed at an end (e.g., the bottom) of the insertion recess 428*b*, that serves as the contact portion. As both lateral ends of the rotation shaft of the pressure roller 21 in an axial direction thereof are attached to the bearings 430, respectively, the side walls 428 rotatably support the pressure roller 21.

The fixing device 9 further includes a driving force transmission gear 431 serving as a driving force transmitter that is mounted on one lateral end of the rotation shaft of the pressure roller 21 in the axial direction thereof. In a state in which the side walls 428 support the pressure roller 21, the driving force transmission gear 431 is exposed outside the side wall 428.

Accordingly, when the fixing device 9 is installed in the apparatus body of the image forming apparatus 100, the driving force transmission gear 431 is coupled to a gear disposed inside the apparatus body of the image forming apparatus 100 so that the driving force transmission gear 431 transmits the driving force from the driver. Alternatively, a driving force transmitter that transmits the driving force to the pressure roller 21 may be pulleys over which a driving force transmission belt is stretched taut, a coupler, and the like instead of the driving force transmission gear 431.

The pair of supports 432 that supports the fixing belt 20, the heater holder 23, the stay 24, and the like is disposed opposite both lateral ends of the heater 22 in the longitudinal direction thereof, respectively. The support 432 is made of heat-resistant resin. The support 432 includes a short, tubular flange serving as an inner circumferential face that supports each lateral end of the fixing belt 20 in the longitudinal direction thereof such that the inner circumferential face 20*d* of the fixing belt 20 slides over the flange.

Each of the supports 432 includes guide grooves 432*a*. As the guide grooves 432*a* move along edges of the insertion recess 428*b* of the side wall 428, respectively, and enter the insertion recess 428*b*, the support 432 is attached to the side wall 428.

The fixing device 9 further includes a pair of springs 433 serving as a pair of biasing members that is interposed between the supports 432 and the rear wall 429, respectively. As the springs 433 bias the stay 24 and the supports 432 toward the pressure roller 21, respectively, the fixing belt 20 is pressed against the pressure roller 21 to form the fixing nip N between the fixing belt 20 and the pressure roller 21.

In order to release pressure applied at the fixing nip N, the supports 432 move rightward in FIG. 7H against a biasing force generated by the springs 433. Accordingly, the heater 22 and the heater holder 23 move to the separation position.

The rear wall 429 constructing the second device frame 426 includes a hole 429*b* that is disposed at one lateral end of the rear wall 429 in a longitudinal direction of the second device frame 426. The hole 429*b* serves as a positioner that positions a device body of the fixing device 9 with respect to the apparatus body of the image forming apparatus 100. On the other hand, the apparatus body of the image forming apparatus 100 mounts a projection 401 serving as a positioner.

As the projection 401 is inserted into the hole 429*b* of the fixing device 9, the projection 401 engages the hole 429*b*, positioning the device body of the fixing device 9 with respect to the apparatus body of the image forming apparatus 100 in the longitudinal direction of the fixing belt 20. Although the hole 429*b* serving as the positioner is disposed at one lateral end of the rear wall 429 in the longitudinal direction of the second device frame 426, another positioner is not disposed at another lateral end of the rear wall 429. Thus, the second device frame 426 does not restrict thermal expansion and shrinkage of the device body of the fixing device 9 in the longitudinal direction of the fixing belt 20 due to temperature change.

A description is provided of improvement in separation of the sheet P by the heater holder 23.

Figure 7I:
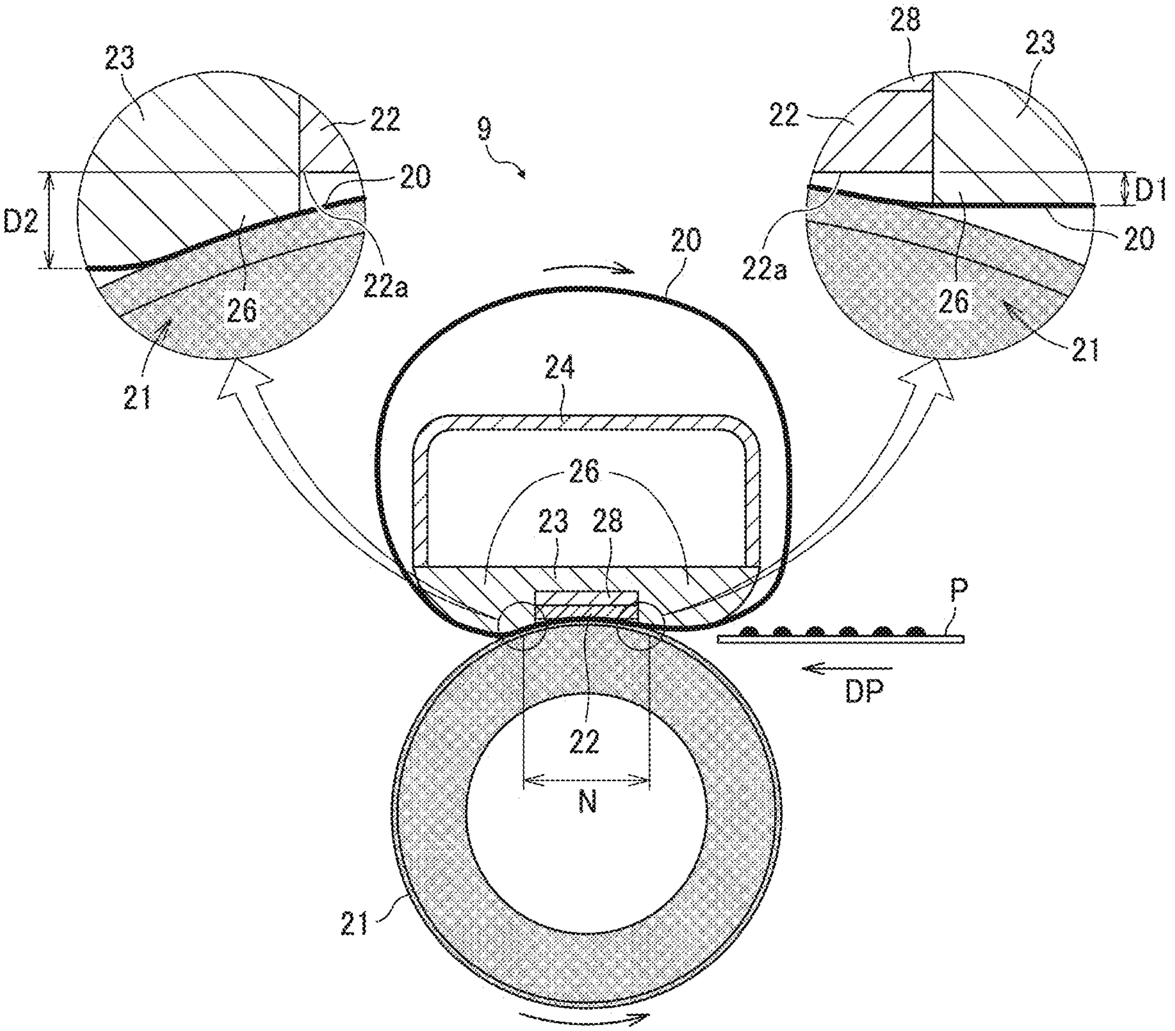
FIG. 7I is a cross-sectional view of the fixing device depicted in FIG. 2, illustrating a heater holder incorporated therein that improves separation of a sheet.

FIG. 7I is a cross-sectional view of the fixing device 9 incorporating the heater holder 23 that improves separation of the sheet P. The heater 22 supported by the heater holder 23 is set back or recessed from the fixing nip N for a predetermined depth.

For example, the heater 22 has a nip forming face 22*a* that is set back along the guides 26 disposed on a right portion and a left portion of the heater holder 23 in FIG. 7I for predetermined depths D1 and D2, respectively. The nip forming face 22*a* defines a recess recessed with respect to the pressure roller 21. The depth D1 from the fixing nip N is equal to the depth D2 from the fixing nip N (D1=D2). Alternatively, the depth D2 defined in proximity to the exit of the fixing nip N is greater than the depth D1 (D1<D2).

Accordingly, the fixing belt 20 has curvatures that are great at an entry to the fixing nip N and the exit of the fixing nip N. Thus, the great curvatures of the fixing belt 20 define a sheet conveyance path that is bent toward the pressure roller 21 at the entry to the fixing nip N and the exit of the fixing nip N. Consequently, the sheet P discharged from the fixing nip N is conveyed toward the pressure roller 21 in a separation direction in which the sheet P separates from the fixing belt 20, reducing a failure that the sheet P is wound around the fixing belt 20 and jammed.

As described above, if the heater 22 is set back for the depths D1 and D2 to improve separation of the sheet P, when the fixing belt 20 interrupts rotation, the fixing belt 20 is more subject to platy deformation (e.g., flat spots) at the fixing nip N. Accordingly, a mechanism that prevents the separation plate 310 of the sheet separation assembly 300 from coming into contact with the fixing belt 20 is employed advantageously.

A description is provided of a configuration of a thermal conductor.

The fixing device 9 includes a thermal conductor 28 that is sandwiched between the heater 22 and the heater holder 23. The thermal conductor 28 has one face that contacts a back face of the heater 22 and another face that contacts the heater holder 23.

The thermal conductor 28 improves evenness of heat generated by the heater 22 in the longitudinal direction thereof, thus enhancing quality of an image formed on a sheet P. The thermal conductor 28 is made of a material having a thermal conductivity greater than a thermal conductivity of the base 30 of the heater 22, such as graphene and graphite.

A description is provided of operations of the sheet separation assembly 300.

As described above, the fixing belt 20 is made of polyimide or the like as heat-resistant resin. Since the fixing belt 20 is thin, the fixing belt 20 is subject to deformation while the fixing belt 20 interrupts rotation. If the fixing belt 20 rotates in a state in which the fixing belt 20 suffers from deformation, the fixing belt 20 may suffer from change in the orbit.

For example, while the fixing belt 20 interrupts rotation, the fixing belt 20 sandwiched between the heater 22 and the pressure roller 21 at the fixing nip N suffers from platy deformation as illustrated with a bold line in FIG. 7A. The fixing belt 20 has a cooldown time that is substantially different from a cooldown time of the heater 22. Hence, the fixing belt 20 is more subject to deformation. If the fixing belt 20 resumes rotation in a state in which the fixing belt 20 suffers from deformation, since the fixing device 9 does not incorporate a restrictor that is disposed within the loop formed by the fixing belt 20 and restricts deformation of the fixing belt 20, the fixing belt 20 may suffer from irregular change in the orbit with a warped shape (e.g., flapping) as illustrated with chain lines drawing a vertical oval and a horizontal oval, respectively, in FIG. 7A.

A description is provided of a configuration of a second comparative fixing device.

The second comparative fixing device includes a separator that is secured therein. Even if a roller suppresses change in an orbit of a fixing belt, an intermediate portion of the fixing belt in an axial direction thereof may come into contact with the separator that damages the fixing belt. Conversely, the fixing belt may separate from the separator excessively, causing the separator to separate a sheet from the fixing belt faultily and jamming the sheet.

To address the circumstance of the second comparative fixing device, the fixing device 9 according to the embodiment includes the flat springs 330 serving as the biasing members that generate a biasing force that brings the contact portions 313 into contact with the outer circumferential face of the fixing belt 20 in the non-conveyance spans N20, that is, both lateral end spans in the axial direction of the fixing belt 20. The separation plate 310 moves in accordance with change in the orbit of the fixing belt 20 that is deformed. Accordingly, as illustrated in FIG. 7D, the separation plate 310 retains the clearance 6, that is appropriate and uniform, between the edge portion 311 of the separation plate 310 and the fixing belt 20. Consequently, the separation plate 310 separates the sheet P stably.

The clearance δ has a size in a range of from 0.2 mm to 2.0 mm, for example. The edge portion 311 of the separation plate 310 is situated within a distance L1 from the exit of the fixing nip N in a tangential direction. For example, the distance L1 is in a range of from 5 mm to 10 mm in the tangential direction (e.g., Y-direction). The edge portion 311 is situated within a distance L2 from a tangential line that is tangent to the exit of the fixing nip N. The distance L2 is in a range of from 2 mm to 7 mm in Z-direction. However, the distances L1 and L2 are not limited to the ranges described above, respectively, and are adjusted properly.

According to the embodiment, the contact portions 313 of the separation plate 310 move in accordance with deformation of the fixing belt 20 in both lateral end portions of the fixing belt 20 in the axial direction thereof, respectively. Conversely, the fixing device 9 does not incorporate the restrictor that restricts deformation of the fixing belt 20 throughout the entire span in the axial direction thereof. Hence, the fixing belt 20 deforms similarly throughout the entire span in the axial direction thereof.

The separation plate 310 is contiguous from one lateral end to another lateral end in the axial direction of the fixing belt 20. Hence, the separation plate 310 retains the clearance δ depicted in FIG. 7D that has a uniform size from each lateral end to a center of the fixing belt 20 in the axial direction thereof. Accordingly, the separation plate 310 separates the sheet P stably. Consequently, the fixing device 9 outputs the sheet P bearing a proper image stably.

A description is provided of a mechanism that applies pressure at the fixing nip N and releases the pressure.

The mechanism that applies pressure at the fixing nip N provides two configurations, that is, a first pressing configuration and a second pressing configuration. In the first pressing configuration, the heater holder 23 disposed within the loop formed by the fixing belt 20 is secured. For example, the heater holder 23 is secured to the device frame 440. The pressure roller 21 comes into contact with and separates from the fixing belt 20. The pressure roller 21 is biased toward the fixing belt 20.

In the first pressing configuration, since the heater 22 is secured to the device frame 440, for example, the fixing belt 20 is placed on the heater 22 stably. Hence, a distance from the edge portion 311 of the separation plate 310 to the fixing belt 20 is also stabilized. Accordingly, the separation plate 310 separates the sheet P stably.

In the second pressing configuration, the pressure roller 21 (e.g., the core metal 21*a* of the pressure roller 21) is secured. The fixing belt 20 comes into contact with and separates from the pressure roller 21. The fixing belt 20 is biased toward the pressure roller 21. The second pressing configuration is more preferable than the first pressing configuration because the user or the service engineer pulls out the jammed sheet P with a smaller pulling force so as to remove the sheet P.

For example, in the second pressing configuration, the fixing belt 20 separates from the pressure roller 21 to release pressure applied at the fixing nip N. The fixing belt 20 also separates from the separation plate 310. Hence, the second pressing configuration prevents the edge portion 311 of the separation plate 310 from damaging or breaking the fixing belt 20 effectively when the jammed sheet P is removed.

Additionally, a clearance between the restrictor 321*a* and the separation plate 310 is smaller than a pressure releasing amount (e.g., a gap between the fixing belt 20 and the pressure roller 21). Accordingly, when the fixing belt 20 releases pressure applied at the fixing nip N, the restrictor 321*a* restricts clockwise pivoting of the separation plate 310 in FIGS. 7A, 7C, and 7E. Consequently, the clearance δ between the fixing belt 20 and the edge portion 311 of the separation plate 310 increases. Hence, the second pressing configuration prevents the edge portion 311 of the separation plate 310 from damaging or breaking the fixing belt 20 effectively when the jammed sheet P is removed.

If the user or the service engineer does not see the jammed sheet P through the fixing nip N clearly, the user or the service engineer does not pull out the sheet P readily. If the clearance δ between the fixing belt 20 and the edge portion 311 of the separation plate 310 increases, the user or the service engineer rotates the pressure roller 21 and the fixing belt 20 backward readily to move the sheet P upstream from the fixing nip N in the sheet conveyance direction DP (e.g., leftward in FIGS. 7A, 7C, and 7E) for a length of the sheet P, that is great enough for the user or the service engineer to pull out the sheet P.

When the fixing belt 20 rotates backward to move the jammed sheet P, the fixing belt 20 draws an orbit that is different from an orbit drawn when the fixing belt 20 rotates forward in the rotation direction D20 depicted in FIG. 2. Accordingly, even if the orbit of the fixing belt 20 changes, the edge portion 311 of the separation plate 310 does not preferably contact the fixing belt 20 in the second pressing configuration.

A description is provided of a graphene sheet.

The thermal conductor 28 is made of the graphene sheet. Hence, the thermal conductor 28 has an enhanced thermal conductivity in a predetermined direction along a surface of the graphene sheet, that is, an arrangement direction in which the resistive heat generators 31 are arranged, not a thickness direction of the heater 22. Accordingly, the thermal conductor 28 suppresses uneven temperature of the heater 22 and the fixing belt 20 in the arrangement direction effectively.

Figure 8:
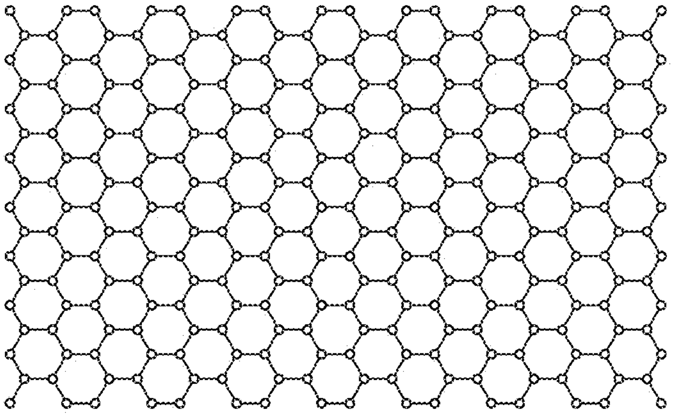
FIG. 8 is a diagram of a crystalline structure of atoms of graphene.

Graphene is thin powder. As illustrated in FIG. 8, graphene is constructed of a plane of carbon atoms arranged in a two-dimensional honeycomb lattice. The graphene sheet is graphene in a sheet form and is usually constructed of a single layer. The graphene sheet may contain impurities in the single layer of carbon atoms.

The graphene sheet may have a fullerene structure. The fullerene structure is generally recognized as a polycyclic compound constructed of an identical number of carbon atoms bonded to form a cage with fused rings of five and six atoms. For example, the fullerene structure is a closed cage structure formed of fullerene C60, C70, and C80, 3-coordinated carbon atoms, or the like.

The graphene sheet is artificial and is produced by chemical vapor deposition (CVD), for example. The graphene sheet is commercially available. A size and a thickness of the graphene sheet and a number of layers and the like of a graphite sheet described below are measured with a transmission electron microscope (TEM), for example.

Figure 9:
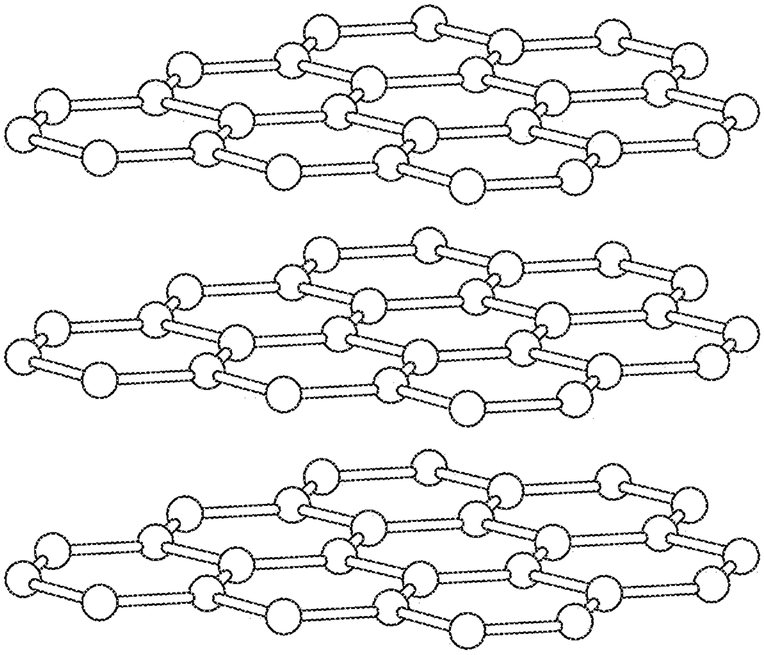
FIG. 9 is a diagram of a crystalline structure of atoms of graphite.

Graphite is constructed of stacked layers of graphene and is highly anisotropic in thermal conduction. As illustrated in FIG. 9, graphite has a plurality of layers, each of which is constructed of hexagonal fused rings of carbon atoms, that are bonded planarly. The plurality of layers defines a crystalline structure.

In the crystalline structure, adjacent carbon atoms in the layer are bonded with each other by a covalent bond. Bonding between layers of carbon atoms is established by the van der Waals bond. The covalent bond achieves bonding greater than bonding by the van der Waals bond. Graphite is highly anisotropic with bonding within the layer and bonding between the layers.

For example, the thermal conductor 28 is made of graphite. Accordingly, the thermal conductor 28 attains an efficiency in conduction of heat in the arrangement direction in which the resistive heat generators 31 are arranged, that is, a longitudinal direction of the thermal conductor 28, which is greater than an efficiency in conduction of heat in a thickness direction of the thermal conductor 28, that is, a laminating direction in which the heater holder 23 and the heater 22 are arranged, thus suppressing conduction of heat to the heater holder 23. Consequently, the thermal conductor 28 suppresses uneven temperature of the heater 22 in the arrangement direction in which the resistive heat generators 31 are arranged, that is, the longitudinal direction of the heater 22, efficiently. Additionally, the thermal conductor 28 minimizes heat conducted to the heater holder 23. The thermal conductor 28 made of graphite attains enhanced heat resistance that inhibits oxidation at approximately 700 degrees Celsius.

The graphite sheet has a physical property and a dimension that are adjusted properly according to a function of the thermal conductor 28. For example, the graphite sheet is made of graphite having enhanced purity or single crystal graphite. The graphite sheet has an increased thickness to enhance anisotropic thermal conduction.

In order to perform high speed fixing, each of the fixing devices 9, 9A, 9B, and 9C employs the graphite sheet having a decreased thickness to decrease thermal capacity of each of the fixing devices 9, 9A, 9B, and 9C. If the fixing nip N and the heater 22 have an increased length in the longitudinal direction thereof, the thermal conductor 28 may also have an increased length in the arrangement direction in which the resistive heat generators 31 are arranged, that is, the longitudinal direction of the thermal conductor 28.

In view of increasing mechanical strength, the graphite sheet preferably has a number of layers that is not smaller than 11 layers. The graphite sheet may include a part constructed of a single layer and another part constructed of a plurality of layers.

The above describes the embodiments of the present disclosure applied to a fixing device (e.g., the fixing devices 9, 9A, 9B, and 9C) as one example of a nip forming unit, a nip forming device, or a belt type heating device including a rotator driver. However, application of the embodiments of the present disclosure is not limited to the fixing device. Alternatively, the embodiments of the present disclosure may be applied to a heating device such as a dryer that dries liquid such as ink applied on a sheet, a laminator that bonds film as a coating member onto a surface of a sheet by thermocompression, and a heat sealer that bonds sealing portions of a packaging material by thermocompression. The embodiments of the present disclosure are also applied to a rotator driver that does not incorporate a heat source such as a heater.

Referring to FIGS. 10 to 20, a description is provided of constructions of fixing devices according to modification embodiments of the fixing device 9 depicted in FIG. 2.

FIGS. 10 to 20 omit illustration of the sheet separation assemblies 300, 300A, 300B, and 300C described above with reference to FIGS. 7A, 7C, 7E, and 7F. For example, the sheet separation assembly 300, 300A, 300B, or 300C is disposed downstream from the fixing nip N or a fixing nip N2 in the sheet conveyance direction DP depicted in FIGS. 10 to 13 in which the sheet P is conveyed, like the sheet separation assemblies 300, 300A, 300B, and 300C depicted in FIGS. 7A, 7C, 7E, and 7F, respectively.

Figure 10:
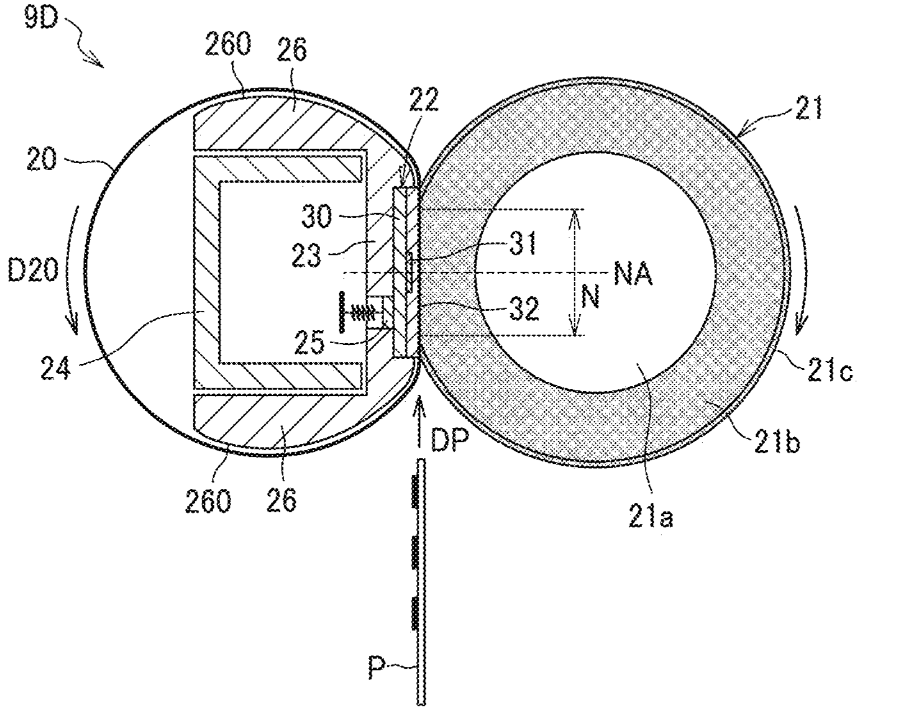
FIG. 10 is a cross-sectional view of a fixing device according to yet another embodiment of the present disclosure that is installable in the image forming apparatus depicted in FIG. 1, illustrating an arrangement of thermistors incorporated in the fixing device.

Referring to FIG. 10, a description is provided of a construction of a fixing device 9D according to an embodiment of the present disclosure.

The fixing device 9D incorporates the thermistors 25 that are disposed at positions different from positions of the thermistors 25 depicted in FIG. 2. According to the embodiment, the thermistors 25 are disposed upstream from a center NA of the fixing nip N in the rotation direction D20 of the fixing belt 20, that is, an orthogonal direction perpendicular to the arrangement direction in which the resistive heat generators 31 are arranged. In other words, the thermistors 25 are disposed in proximity to the entry to the fixing nip N. Since a sheet P draws heat from the fixing belt 20 at the entry to the fixing nip N easily, the thermistors 25 detect a temperature of the heater 22 at the entry to the fixing nip N, thus achieving a fixing property of fixing a toner image on the sheet P properly and suppressing fixing offset effectively.

A description is provided of a construction of a fixing device 9E.

Figure 11:
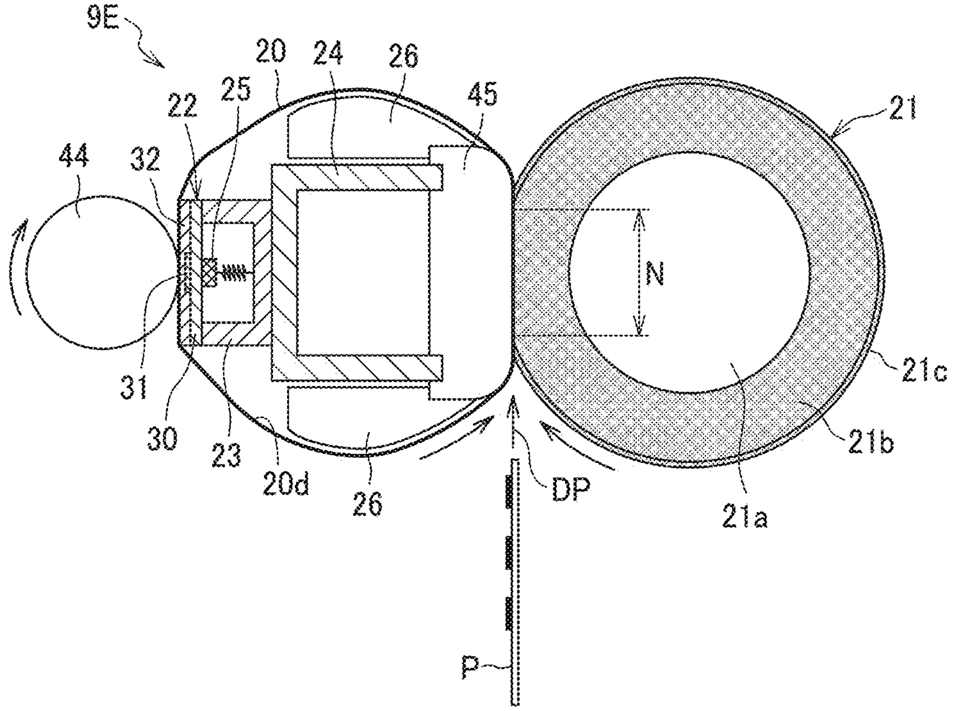
FIG. 11 is a schematic cross-sectional view of a fixing device according to yet another embodiment of the present disclosure that is installable in the image forming apparatus depicted in FIG. 1.

As illustrated in FIG. 11, the fixing device 9E includes a pressing roller 44 disposed opposite the pressure roller 21 via the fixing belt 20. The pressing roller 44 serves as an opposed rotator disposed opposite the fixing belt 20 serving as a rotator. The pressing roller 44 rotates in accordance with rotation of the fixing belt 20. The pressing roller 44 and the heater 22 sandwich the fixing belt 20 so that the heater 22 heats the fixing belt 20.

Within the loop formed by the fixing belt 20 is a nip formation pad 45 serving as a nip former that is disposed opposite the pressure roller 21 via the fixing belt 20. The stay 24 supports the nip formation pad 45. The nip formation pad 45 is in contact with or disposed opposite the inner circumferential face 20*d* of the fixing belt 20. The nip formation pad 45 and the pressure roller 21 sandwich the fixing belt 20 and define the fixing nip N.

Figure 12:
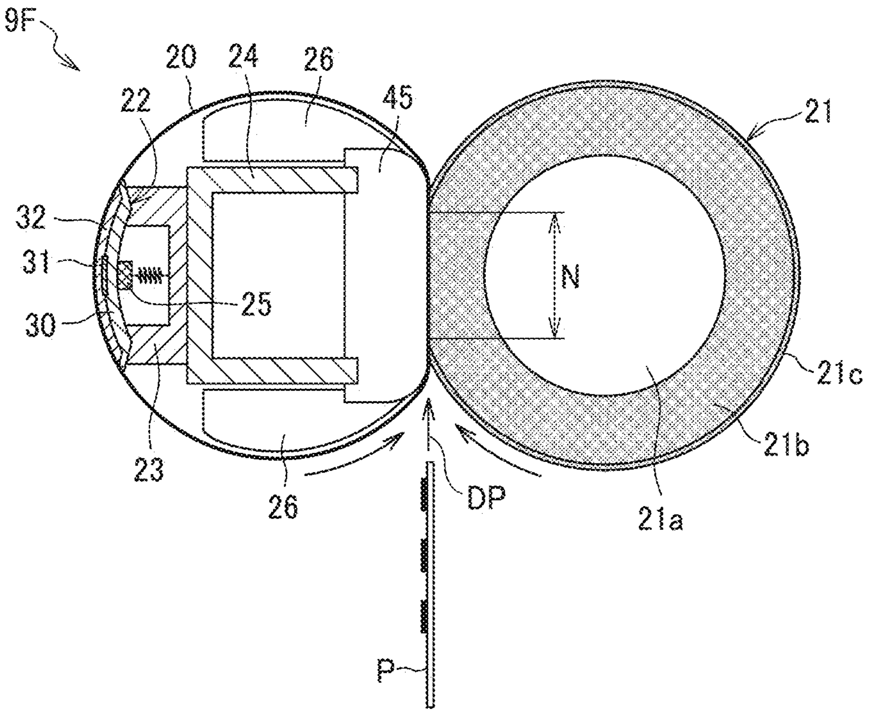
FIG. 12 is a schematic cross-sectional view of a fixing device according to yet another embodiment of the present disclosure that is installable in the image forming apparatus depicted in FIG. 1.

Referring to FIG. 12, a description is provided of a construction of a fixing device 9F according to an embodiment of the present disclosure.

The fixing device 9F does not include the pressing roller 44. In order to attain a contact length for which the heater 22 contacts the fixing belt 20 in the circumferential direction thereof, the heater 22 is curved into an arc in cross section that corresponds to a curvature of the fixing belt 20. Other construction of the fixing device 9F is equivalent to the construction of the fixing device 9E depicted in FIG. 11.

Figure 13:
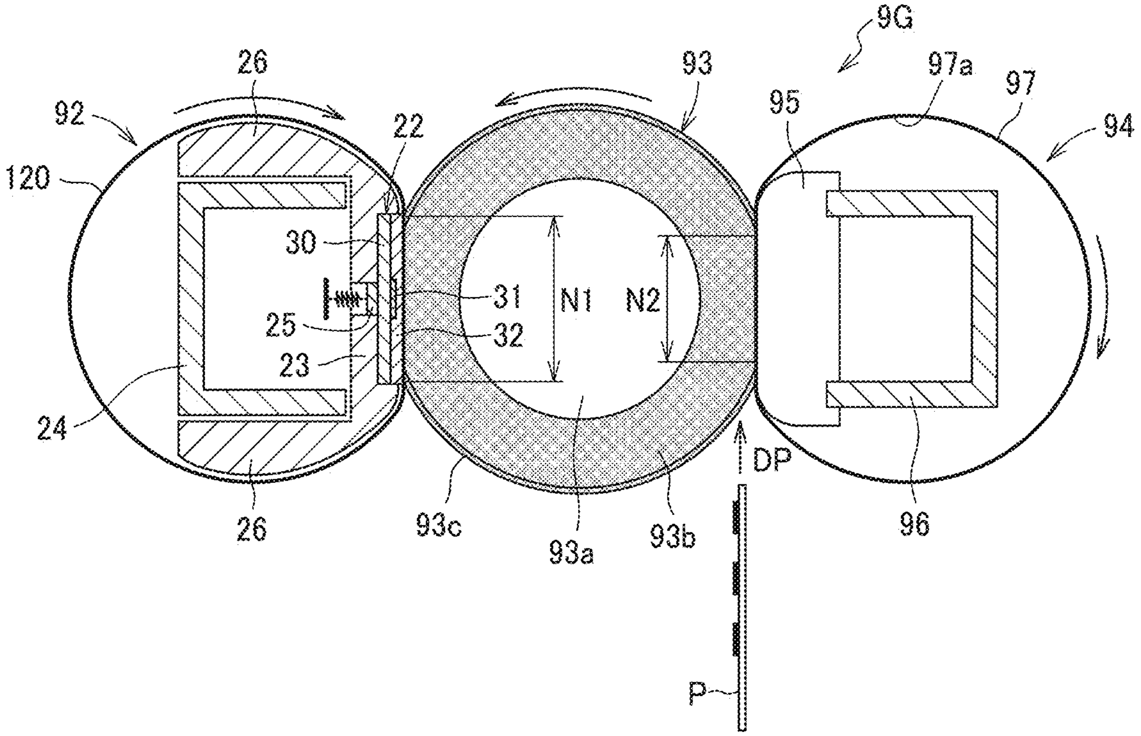
FIG. 13 is a schematic cross-sectional view of a fixing device according to yet another embodiment of the present disclosure that is installable in the image forming apparatus depicted in FIG. 1.

Referring to FIG. 13, a description is provided of a construction of a fixing device 9G according to an embodiment of the present disclosure.

The fixing device 9G includes a heating assembly 92, a fixing roller 93 serving as a pressure rotator, and a pressure assembly 94 serving as a fixing rotator.

The heating assembly 92 includes the heater 22, the heater holder 23, and the stay 24 that are described in the embodiments above and a heating belt 120 serving as a rotator. The fixing roller 93 serves as an opposed rotator disposed opposite the heating belt 120 serving as the rotator. The fixing roller 93 rotates in accordance with rotation of the heating belt 120. The fixing roller 93 includes a core metal 93*a* that is solid and made of iron, an elastic layer 93*b* that is disposed on a surface of the core metal 93*a*, and a release layer 93*c* that coats an outer surface of the elastic layer 93*b*.

The pressure assembly 94 is disposed opposite the heating assembly 92 via the fixing roller 93. The pressure assembly 94 includes a nip formation pad 95, a stay 96, and a pressure belt 97. The pressure belt 97 rotates and is formed into a loop within which the nip formation pad 95 and the stay 96 are disposed. The nip formation pad 95 serving as a nip former is in contact with or disposed opposite an inner circumferential face 97*a* of the pressure belt 97 serving as an endless belt. The heating belt 120 and the fixing roller 93 define a heating nip N1 therebetween. The pressure belt 97 and the fixing roller 93 define the fixing nip N2 therebetween. As a sheet P is conveyed through the fixing nip N2, the fixing roller 93 heated at the heating nip N1 and the pressure belt 97 fix a toner image formed on the sheet P thereon under heat and pressure.

Also in the fixing devices 9D, 9E, 9F, and 9G depicted in FIGS. 10 to 13, respectively, the heater 22 is subject to a decreased heat generation amount at the gap B (e.g., a dividing region) between the adjacent resistive heat generators 31 of the heater 22 in the longitudinal direction thereof depicted in FIG. 4. To address the circumstance, like in the embodiments described above, each of the fixing devices 9D, 9E, 9F, and 9G includes a temperature detector including a temperature detecting element that is disposed opposite the gap B between the adjacent resistive heat generators 31 of the heater 22. Accordingly, the heater 22 heats an opposed portion of the rotator (e.g., the fixing belt 20 and the heating belt 120), which is disposed opposite the gap B, sufficiently. Consequently, the heater 22 attains the fixing property of fixing the toner image on the sheet P properly and prevents failures such as fixing offset.

Application of the technology of the present disclosure is not limited to the fixing devices (e.g., the fixing devices 9, 9A, 9B, 9C, 9D, 9E, 9F, and 9G) according to the embodiments described above. For example, the technology of the present disclosure is also applied to a heating device such as a dryer that dries ink applied onto a sheet. Further, the technology of the present disclosure is also applied to a heating device such as a thermocompression bonding device including a laminator and a heat sealer. The laminator bonds film as a coating member onto a surface of a sheet by thermocompression. The heat sealer bonds sealing portions of a packaging material by thermocompression. Accordingly, the heating device heats the opposed portion of the rotator, which is disposed opposite the gap B, sufficiently.

Application of the technology of the present disclosure is not limited to the color image forming apparatus 100 depicted in FIG. 1 that forms a color toner image. The technology of the present disclosure is also applied to a monochrome image forming apparatus that forms a monochrome toner image, a copier, a printer, a facsimile machine, a multifunction peripheral (MFP) having at least two of copying, printing, facsimile, scanning, and plotter functions, or the like.

Figure 14:
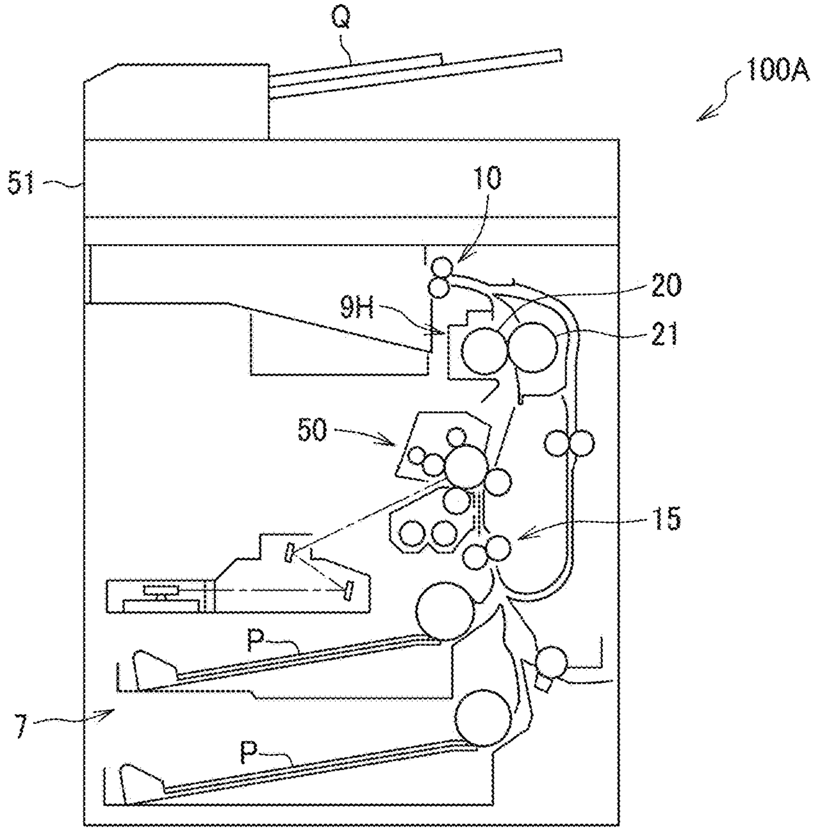
FIG. 14 is a schematic cross-sectional view of an image forming apparatus according to another embodiment of the present disclosure that is different from the image forming apparatus depicted in FIG. 1.

For example, FIG. 14 illustrates an image forming apparatus 100A applied with the technology of the present disclosure. The image forming apparatus 100A according to an embodiment includes an image forming device 50 including a photoconductive drum, a sheet conveyance device including the timing roller pair 15, the sheet feeder 7, a fixing device 9H, the output device 10, and a scanner 51. The sheet feeder 7 includes a plurality of sheet trays (e.g., paper trays) that loads a plurality of sheets P having different sizes, respectively.

The scanner 51 reads an image on an original Q into image data. The sheet feeder 7 loads the plurality of sheets P and feeds the sheets P to a conveyance path one by one. The timing roller pair 15 conveys the sheet P conveyed through the conveyance path to the image forming device 50.

The image forming device 50 forms a toner image on the sheet P. For example, the image forming device 50 includes the photoconductive drum, a charging roller, an exposure device, a developing device, a replenishing device, a transfer roller, a cleaner, and a discharger. The toner image is a reproduction of the image on the original Q, for example.

The fixing device 9H fixes the toner image on the sheet P under heat and pressure. The sheet P bearing the fixed toner image is conveyed to the output device 10 by a conveyance roller and the like. The output device 10 ejects the sheet P onto an outside of the image forming apparatus 100A.

A description is provided of a construction of the fixing device 9H according to an embodiment of the present disclosure.

A description of a construction of the fixing device 9H, which is common to the fixing device 9 depicted in FIG. 2, is omitted properly.

Figure 15:
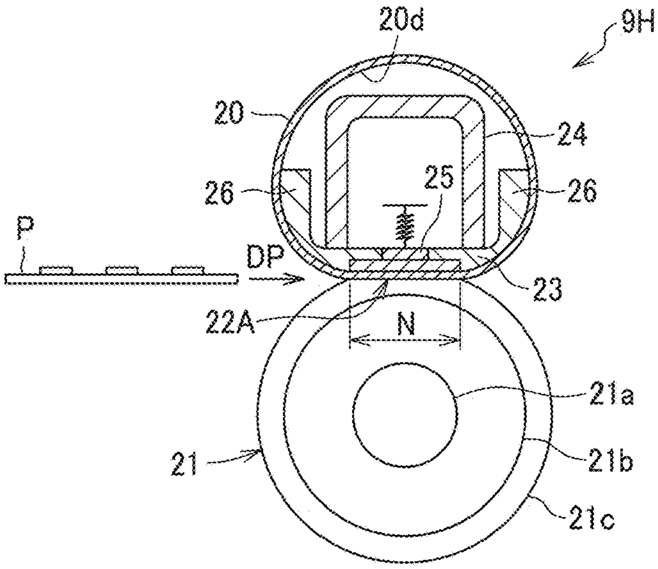
FIG. 15 is a schematic cross-sectional view of a fixing device according to yet another embodiment of the present disclosure that is incorporated in the image forming apparatus depicted in FIG. 14.

As illustrated in FIG. 15, the fixing device 9H includes the fixing belt 20, the pressure roller 21, a heater 22A, the heater holder 23, the stay 24, and the thermistors 25. The fixing belt 20 and the pressure roller 21 define the fixing nip N therebetween. The fixing nip N has a nip length of 10 mm in the sheet conveyance direction DP. The fixing belt 20 and the pressure roller 21 convey the sheet P at a linear velocity of 240 mm/s. For example, the sheet separation assembly 300, 300A, 300B, or 300C is disposed downstream from the fixing nip N in the sheet conveyance direction DP depicted in FIG. 15 in which the sheet P is conveyed, like the sheet separation assemblies 300, 300A, 300B, and 300C depicted in FIGS. 7A, 7C, 7E, and 7F, respectively.

The fixing belt 20 includes the base layer 20*a* made of polyimide and the release layer 20*b* depicted in FIG. 2 and does not include the elastic layer. The release layer 20*b* is heat-resistant film made of fluororesin, for example. The fixing belt 20 has an outer diameter of approximately 24 mm.

The pressure roller 21 includes the core metal 21*a*, the elastic layer 21*b*, and the release layer 21*c*. The pressure roller 21 has an outer diameter in a range of from 24 mm to 30 mm. The elastic layer 21*b* has a thickness in a range of from 3 mm to 4 mm.

Figure 16:
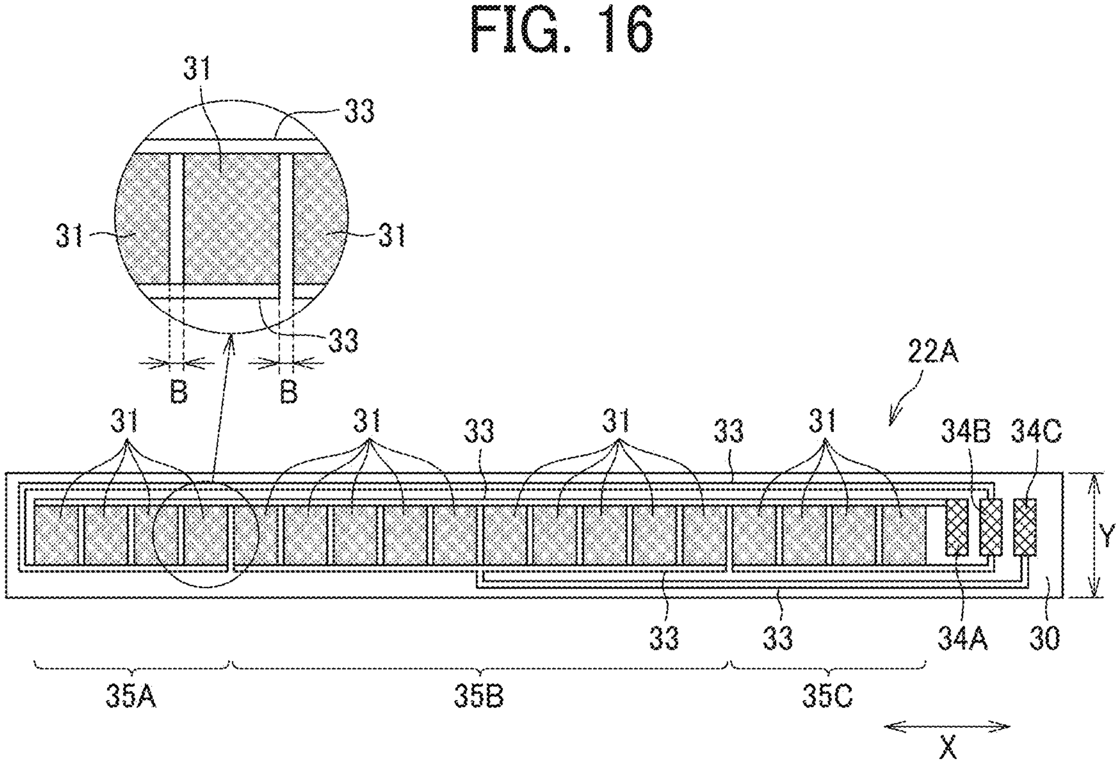
FIG. 16 is a plan view of a heater incorporated in the fixing device depicted in FIG. 15.

As illustrated in FIG. 16, the heater 22A serving as a nip formation pad or a nip former includes the base 30, a thermal insulation layer, a conductor layer including the resistive heat generators 31, and an insulating layer. The heater 22A has a total thickness of 1 mm. The heater 22A has a width of 13 mm in the orthogonal direction (e.g., Y-direction) perpendicular to the arrangement direction (e.g., X-direction) in which the resistive heat generators 31 are arranged.

As illustrated in FIG. 16, the conductor layer of the heater 22A includes the plurality of resistive heat generators 31, the feeders 33, and electrodes 34A, 34B, and 34C. According to the embodiment also, the gap B is interposed between the adjacent resistive heat generators 31 in the arrangement direction in which the resistive heat generators 31 are arranged. FIG. 16 illustrates the two gaps B in an enlarged view. However, the gap B is disposed at each interval between the adjacent resistive heat generators 31 depicted in FIG. 16.

The heater 22A further includes the three heat generation portions 35A, 35B, and 35C each of which is constructed of the resistive heat generators 31. As the electrodes 34A and 34B are energized, the heat generation portions 35A and 35C serving as lateral end heating portions generate heat. As the electrodes 34A and 34C are energized, the heat generation portion 35B serving as a center heating portion generates heat. For example, in order to fix a toner image on a sheet P having a decreased size not greater than a predetermined size, the heat generation portion 35B generates heat. In order to fix a toner image on a sheet P having an increased size greater than the predetermined size, the heat generation portions 35A, 35B, and 35C generate heat.

Figure 17:
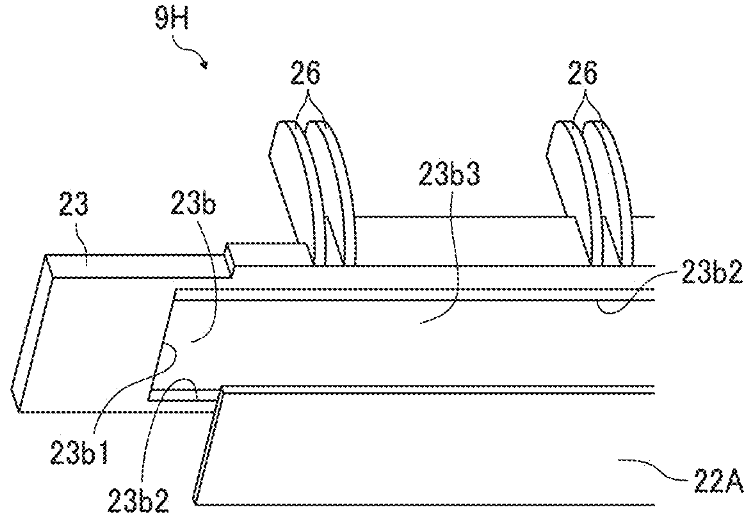
FIG. 17 is a perspective view of the heater depicted in FIG. 16 and the heater holder incorporated in the fixing device depicted in FIG. 15.

As illustrated in FIG. 17, the heater holder 23 includes a recess 23*b* that holds the heater 22A. The recess 23*b* is disposed on a heater opposed face of the heater holder 23, which is disposed opposite the heater 22A. The recess 23*b* includes a bottom face 23*b*3 and walls 23*b*1 and 23*b*2. The bottom face 23*b*3 is substantially parallel to the base 30 and recessed with respect to the heater 22A compared to other faces of the heater holder 23. The wall 23*b*1 is disposed at at least one of both lateral ends of the heater holder 23 in the arrangement direction in which the resistive heat generators 31 are arranged and serves as an interior wall of the heater holder 23. The walls 23*b*2 are disposed at both ends of the heater holder 23 in the orthogonal direction perpendicular to the arrangement direction and serve as interior walls of the heater holder 23, respectively.

The heater holder 23 mounts the guides 26. The heater holder 23 is made of LCP.

Figure 18:
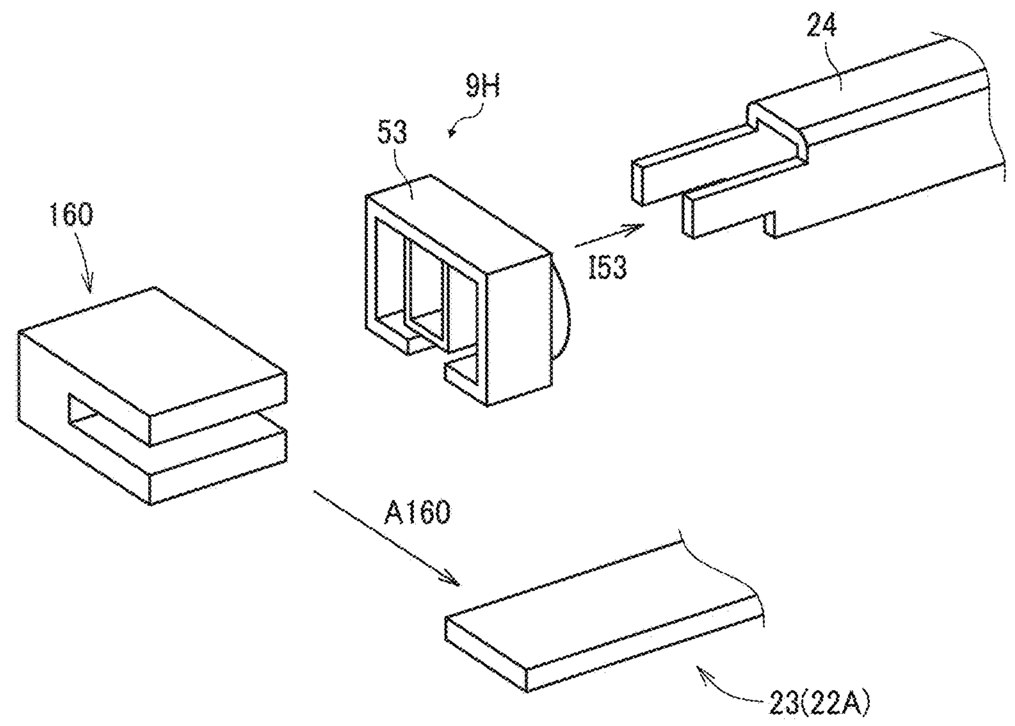
FIG. 18 is a perspective view of the heater depicted in FIG. 17 and a connector to be attached to the heater.

As illustrated in FIG. 18, the fixing device 9H further includes a connector 160 that includes a housing made of resin such as LCP and a plurality of contact terminals disposed in the housing. The connector 160 is attached to the heater 22A and the heater holder 23 such that the connector 160 sandwiches the heater 22A and the heater holder 23 together at a front face and a back face of the heater 22A and the heater holder 23.

In a state in which the connector 160 sandwiches and holds the heater 22A and the heater holder 23, as the contact terminals of the connector 160 contact and press against the electrodes 34A, 34B, and 34C of the heater 22A, the heat generation portions 35A, 35B, and 35C are electrically connected to a power supply disposed in the image forming apparatus 100A through the connector 160. Thus, the power supply is ready to supply power to the heat generation portions 35A, 35B, and 35C. At least a part of each of the electrodes 34A, 34B, and 34C is not coated with the insulating layer and is exposed so that each of the electrodes 34A, 34B, and 34C is coupled to the connector 160.

The fixing device 9H further includes a flange 53 that is disposed opposite each lateral end of the fixing belt 20 in the longitudinal direction thereof. The flange 53 contacts the inner circumferential face 20*d* of the fixing belt 20 depicted in FIG. 15 and holds or supports the fixing belt 20 at each lateral end of the fixing belt 20 in the longitudinal direction thereof. The flanges 53 are secured to a frame of the fixing device 9H. The flange 53 is inserted into each lateral end of the stay 24 in the longitudinal direction thereof in an insertion direction 153 illustrated in FIG. 18.

The connector 160 is attached to the heater 22A and the heater holder 23 in an attachment direction A160 illustrated in FIG. 18 that is parallel to the orthogonal direction perpendicular to the arrangement direction in which the resistive heat generators 31 are arranged as illustrated in FIG. 16. Alternatively, in order to attach the connector 160 to the heater holder 23, one of the connector 160 and the heater holder 23 may include a projection that engages a recess disposed in another one of the connector 160 and the heater holder 23 such that the projection moves inside the recess relatively. The connector 160 is attached to one lateral end of the heater 22A and the heater holder 23 in the arrangement direction in which the resistive heat generators 31 are arranged. The one lateral end of the heater 22A and the heater holder 23 is opposite to another lateral end of the heater 22A and the heater holder 23 to which the driver (e.g., a motor) that drives the pressure roller 21 is coupled.

Figure 19:
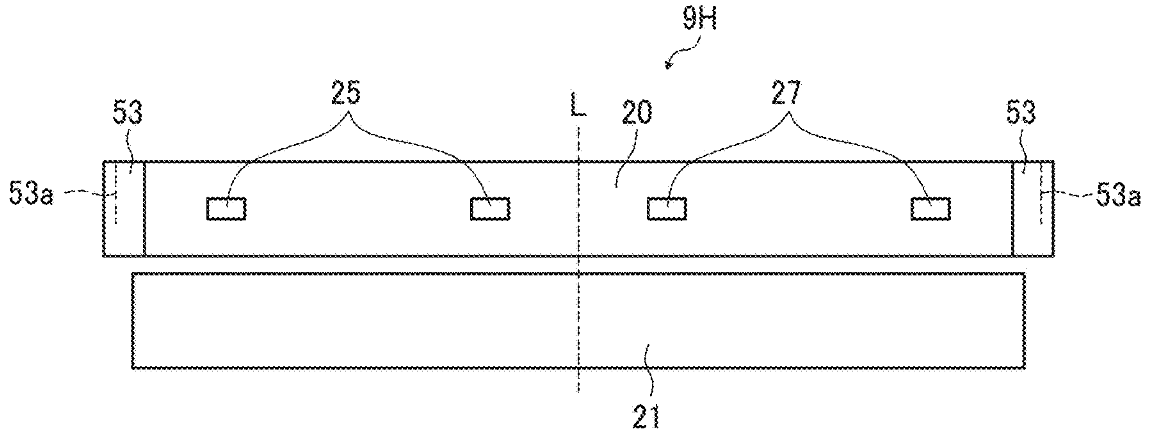
FIG. 19 is a diagram of the thermistors, thermostats, and flanges incorporated in the fixing device depicted in FIG. 15, illustrating an arrangement of the thermistors and the thermostats.

As illustrated in FIG. 19, the thermistors 25 are disposed opposite the inner circumferential face 20*d* of the fixing belt 20 at a position in proximity to a center line L and a position in one lateral end span of the fixing belt 20 in the longitudinal direction thereof, respectively. The controller 220 depicted in FIG. 5 controls the heater 22A based on a temperature of the fixing belt 20, that is detected by the thermistor 25 disposed at the position in proximity to the center line L, and a temperature of the fixing belt 20, that is detected by the thermistor 25 disposed opposite the one lateral end span of the fixing belt 20 in the longitudinal direction thereof, respectively. Like the thermistor 25 of the fixing device 9 according to the embodiment described above with reference to FIG. 2, one of the thermistors 25 depicted in FIG. 19 is disposed opposite the gap B between the adjacent resistive heat generators 31 of the heater 22A.

The thermostats 27 are disposed opposite the inner circumferential face 20*d* of the fixing belt 20 at a position in proximity to the center line L and a position in another lateral end span of the fixing belt 20 in the longitudinal direction thereof, respectively. If the thermostat 27 detects a temperature of the fixing belt 20, that is higher than a preset threshold, the thermostat 27 breaks power to the heater 22A.

The flanges 53 contact and support both lateral ends of the fixing belt 20 in the longitudinal direction thereof, respectively. Each of the flanges 53 is made of LCP.

Figure 20:
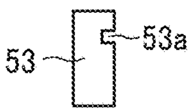
FIG. 20 is a diagram of the flange depicted in FIG. 19, illustrating a slide groove of the flange.

As illustrated in FIG. 20, the flange 53 includes a slide groove 53*a*. The slide groove 53*a* extends in a contact-separation direction in which the fixing belt 20 comes into contact with and separates from the pressure roller 21. The slide groove 53*a* engages an engagement mounted on the frame of the fixing device 9H. As the engagement moves relatively inside the slide groove 53*a*, the fixing belt 20 moves in the contact-separation direction with respect to the pressure roller 21.

Also in the fixing device 9H, the thermistor 25 includes a temperature detecting element that is disposed opposite the gap B between the adjacent resistive heat generators 31 of the heater 22A. Accordingly, the heater 22A heats the opposed portion of the fixing belt 20, which is disposed opposite the gap B, sufficiently. Consequently, the heater 22A attains the fixing property of fixing the toner image on the sheet P properly and prevents failures such as fixing offset.

An image forming apparatus that forms a monochrome toner image with toner in a single color is less subject to hot offset compared to an image forming apparatus that forms a color toner image with toners in a plurality of colors. Hence, like in the embodiments of the present disclosure, even if the controller 220 controls the heater 22A based on a detection result provided by the temperature detecting element that is disposed opposite the gap B between the adjacent resistive heat generators 31, the image forming apparatus that uses the toner in the single color is less susceptible to hot offset advantageously.

The above describes the embodiments of the present disclosure. However, the technology of the present disclosure is not limited to the embodiments described above and is modified into variations. For example, the separation plate 310 depicted in FIG. 7A moves toward and away from the fixing belt 20. The separation plate 310 pivots as described above in the embodiments. Alternatively, in a state in which the separation plate 310 retains parallelism with the heater holder 23, the separation plate 310 may move in parallel to the heater holder 23 in a contact-separation direction with respect to the fixing belt 20.

According to the embodiments described above, the fixing belt 20 of the fixing device 9, 9A, 9B, 9C, 9D, 9E, 9F, 9G, or 9H is used as an endless belt. Alternatively, the endless belt may be a photoconductor belt. For example, the separation plate 310 may be installed in an image forming apparatus that transfers a toner image borne on the photoconductor belt serving as an image bearer onto a recording medium (e.g., a sheet) serving as a conveyed object. The separation plate 310 separates the recording medium from the photoconductor belt.

Yet alternatively, the endless belt may be the intermediate transfer belt 11 serving as an image bearer depicted in FIG. 1. For example, the separation plate 310 separates the recording medium conveyed through the secondary transfer nip formed between the intermediate transfer belt 11 and the secondary transfer roller 13 from the intermediate transfer belt 11.

Similarly, the endless belt may be an intermediate transfer belt employed by an inkjet image forming apparatus. The separation plate 310 may be installed in other inkjet image forming apparatus in which a pressure rotator presses against a nip formation pad via an endless belt to form a nip between the pressure rotator and the endless belt. As a conveyed object is conveyed through the nip, the separation plate 310 separates the conveyed object that has passed through the nip from the endless belt.

A description is provided of advantages of a nip forming device (e.g., the fixing devices 9, 9A, 9B, 9C, 9D, 9E, 9F, 9G, and 9H).

As illustrated in FIGS. 2 and 7B, the nip forming device (e.g., a nip forming unit) includes an endless belt (e.g., the fixing belt 20 and the pressure belt 97), a nip formation pad (e.g., the heaters 22 and 22A and the nip formation pads 45 and 95), a pressure rotator (e.g., the pressure roller 21 and the fixing roller 93), a housing (e.g., the device frame 440), a separator (e.g., the separator 310), and a restrictor (e.g., the restrictors 321*a* and 321*b*).

The endless belt is flexible and rotates. The nip formation pad (e.g., a nip former) contacts or is disposed opposite an inner circumferential face (e.g., the inner circumferential faces 20*d* and 97*a*) of the endless belt. The pressure rotator presses against the nip formation pad via the endless belt to form a nip (e.g., the fixing nips N and N2) between the endless belt and the pressure rotator. The nip forming device further includes a belt unit (e.g., the belt unit 18) including the endless belt and the nip formation pad. The housing supports the pressure rotator. A conveyed object (e.g., the sheet P) is conveyed through the nip. The separator separates the conveyed object that is past the nip from the endless belt. The separator moves toward and away from the endless belt. The restrictor restricts motion of the separator that moves toward the endless belt. The restrictor is mounted on the housing.

Accordingly, the restrictor prevents the separator from coming into contact with the endless belt, preventing the endless belt from being warped and damaged.

According to the embodiments described above, the fixing belt 20 serves as an endless belt. Alternatively, a fixing film, a fixing sleeve, or the like may be used as an endless belt. Further, the pressure roller 21 serves as a pressure rotator. Alternatively, a pressure belt or the like may be used as a pressure rotator.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. A nip forming device comprising:

an endless belt that is flexible, the endless belt configured to rotate;

a nip formation pad disposed opposite an inner circumferential face of the endless belt, wherein the nip formation pad includes a heater configured to heat the endless belt;

a pressure rotator configured to rotate, the pressure rotator configured to press against the nip formation pad via the endless belt to form a nip between the endless belt and the pressure rotator, the nip through which a conveyed object is conveyed;

a housing configured to support the pressure rotator;

a separator disposed downstream from the nip in a conveyance direction in which the conveyed object is conveyed, the separator configured to separate the conveyed object from the endless belt, the separator configured to move toward and away from the endless belt; and a restrictor configured to restrict motion of the separator that moves toward the endless belt, the restrictor mounted on the housing.

2. The nip forming device according to claim 1, wherein the restrictor is combined with the housing.

3. The nip forming device according to claim 1, wherein the housing includes:

a side plate disposed at each lateral end of the endless belt in a longitudinal direction of the endless belt; and a rear wall extended in the longitudinal direction of the endless belt and disposed opposite the endless belt.

4. The nip forming device according to claim 3, wherein the restrictor is mounted on one of the side plate and the rear wall.

5. The nip forming device according to claim 3, further comprising another restrictor mounted on the rear wall, wherein the restrictor that is different from said another restrictor is mounted on the side plate.

6. The nip forming device according to claim 1, wherein the heater includes:

a lateral end heating portion disposed opposite a lateral end span of the endless belt in a longitudinal direction of the endless belt, the lateral end heating portion configured to heat the lateral end span of the endless belt; and a center heating portion disposed opposite a center span of the endless belt in the longitudinal direction of the endless belt, the center heating portion configured to heat the center span of the endless belt.

7. The nip forming device according to claim 1, wherein the endless belt is configured to rotate in accordance with rotation of the pressure rotator.

8. The nip forming device according to claim 1, further comprising a biasing member configured to bias and move the separator toward the endless belt.

9. The nip forming device according to claim 1, wherein the separator includes:

a non-contact portion separated from the endless belt; and a contact portion configured to contact the endless belt to retain a clearance between the non-contact portion and the endless belt, the clearance having a predetermined size.

10. The nip forming device according to claim 9, wherein the contact portion includes an elastic body.

11. The nip forming device according to claim 9, wherein the endless belt includes a non-conveyance portion where the conveyed object is not conveyed, and wherein the contact portion of the separator is disposed opposite the non-conveyance portion of the endless belt.

12. The nip forming device according to claim 1, wherein the nip formation pad is configured to move with respect to the pressure rotator between a pressing position where the pressure rotator presses against the nip formation pad via the endless belt at the nip and a separation position where the pressure rotator releases pressure applied at the nip, and wherein the nip formation pad is configured to move to the separation position in a state in which the restrictor restricts motion of the separator.

13. The nip forming device according to claim 1, wherein the endless belt includes a base layer made of resin.

14. The nip forming device according to claim 1, wherein the endless belt has a diameter that is greater than a diameter of the pressure rotator.

15. The nip forming device according to claim 1, wherein the nip formation pad is secured to the housing.

16. The nip forming device according to claim 1, wherein the endless belt includes:

a base layer;

a surface layer; and an adhesion layer interposed between the base layer and the surface layer.

17. The nip forming device according to claim 1, wherein the separator is configured such that the separator is movable against the endless belt during removal of a jammed sheet from the nip forming device.

18. A fixing device for fixing an image on a recording medium, the fixing device comprising:

an endless belt that is flexible, the endless belt configured to rotate;

a nip formation pad disposed opposite an inner circumferential face of the endless belt, wherein the nip formation pad includes a heater configured to heat the endless belt;

a pressure rotator configured to rotate, the pressure rotator configured to press against the nip formation pad via the endless belt to form a nip between the endless belt and the pressure rotator, the nip through which the recording medium bearing the image is conveyed;

a housing configured to support the pressure rotator;

a separator disposed downstream from the nip in a conveyance direction in which the recording medium is conveyed, the separator configured to separate the recording medium from the endless belt, the separator configured to move toward and away from the endless belt; and a restrictor configured to restrict motion of the separator that moves toward the endless belt, the restrictor mounted on the housing.

19. An image forming apparatus comprising:

an image forming device configured to form an image; and a nip forming device configured to convey a recording medium bearing the image, the nip forming device including:

an endless belt that is flexible, the endless belt configured to rotate;

a nip formation pad disposed opposite an inner circumferential face of the endless belt, wherein the nip formation pad includes a heater configured to heat the endless belt;

a pressure rotator configured to rotate, the pressure rotator configured to press against the nip formation pad via the endless belt to form a nip between the endless belt and the pressure rotator, the nip through which the recording medium is conveyed;

a housing configured to support the pressure rotator;

a separator disposed downstream from the nip in a conveyance direction in which the recording medium is conveyed, the separator configured to separate the recording medium from the endless belt, the separator configured to move toward and away from the endless belt; and a restrictor configured to restrict motion of the separator that moves toward the endless belt, the restrictor mounted on the housing.

* * * * *